United States Patent
Ivchenko et al.

(10) Patent No.: US 7,284,664 B1
(45) Date of Patent: *Oct. 23, 2007

(54) METHODS AND APPARATUS FOR PERFORMING DATA ACQUISITION AND CONTROL

(75) Inventors: Olexiy Ivchenko, Watertown, MA (US); Denys L. Kraplin, Holliston, MA (US)

(73) Assignee: United Electronic Industries, Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/330,586

(22) Filed: Jan. 12, 2006

Related U.S. Application Data

(63) Continuation of application No. 10/187,186, filed on Jul. 1, 2002, now Pat. No. 7,007,107.

(60) Provisional application No. 60/336,464, filed on Oct. 22, 2001.

(51) Int. Cl.
*G06F 15/16* (2006.01)

(52) U.S. Cl. .................................................. 209/250

(58) Field of Classification Search ................ 709/250
See application file for complete search history.

(56) References Cited

U.S. PATENT DOCUMENTS

| | | | | |
|---|---|---|---|---|
| 4,488,258 A | * | 12/1984 | Struger et al. | 700/18 |
| 4,972,365 A | * | 11/1990 | Dodds et al. | 710/5 |
| 5,131,092 A | * | 7/1992 | Sackmann et al. | 709/207 |
| 5,168,441 A | * | 12/1992 | Onarheim et al. | 700/17 |
| 5,265,004 A | * | 11/1993 | Schultz et al. | 700/22 |
| 5,285,376 A | * | 2/1994 | Struger et al. | 700/18 |
| 5,388,190 A | * | 2/1995 | Nakano | 706/52 |
| 5,757,922 A | * | 5/1998 | Shiroshita | 380/42 |
| 5,878,033 A | * | 3/1999 | Mouly | 370/312 |
| 5,966,166 A | * | 10/1999 | Coutinho et al. | 348/14.1 |
| 6,205,467 B1 | * | 3/2001 | Lambrecht et al. | 718/108 |
| 6,236,855 B1 | * | 5/2001 | Austin | 455/423 |
| 6,282,454 B1 | * | 8/2001 | Papadopoulos et al. | 700/83 |
| 6,487,457 B1 | * | 11/2002 | Hull et al. | 700/17 |
| 6,711,177 B1 | * | 3/2004 | Young | 370/468 |
| 6,757,522 B1 | * | 6/2004 | Naegeli et al. | 455/67.11 |
| 7,120,505 B2 | * | 10/2006 | Nakamura et al. | 700/3 |

* cited by examiner

*Primary Examiner*—David Y. Eng
(74) *Attorney, Agent, or Firm*—Chapin IP Law, LLC; Barry W. Chapin, Esq.

(57) ABSTRACT

Mechanisms and techniques provide a data acquisition basic input output system between a central controller and a set of modules networked to the central controller. The central controller obtains at least one command to be sent to at least one module of the set of modules networked to the central controller and composing a request message containing the command. The request message has an associated timing pattern selected from a plurality of available timing patterns, such as a fixed timing pattern or a variable timing pattern. The central controller transmits the request message to the module(s) according to the associated timing pattern and receives, according to the associated timing pattern, a response message from the module(s). The data acquisition basic input output system communications do not require reliance on transport layer protocols or collision avoidance techniques.

29 Claims, 8 Drawing Sheets

FIXED TIMING

VARIABLE TIMING

METHODS AND APPARATUS FOR PERFORMING DATA ACQUISITION AND CONTROL

PRIORITY TO RELATED PROVISIONAL APPLICATION

This application is a continuation application and claims the benefit of the filing date of the following U.S. Provisional and Utility patent applications:

1: Formerly filed U.S. Provisional Application for Patent having U.S. Ser. No. 60/336,464 filed Oct. 22, 2001 entitled "Methods and Apparatus for Controlling Signals" which is assigned to the same Assignee as the present invention and which shares co-inventorship with the present invention.

2: Formerly filed U.S. Utility Application for Patent having U.S. Ser. No. 10/187,186 filed Jul. 1, 2002 entitled "METHODS AND APPARATUS FOR PERFORMING DATA ACQUISITION AND CONTROL", now issued U.S. Pat. No. 7,007,107, which is assigned to the same Assignee as the present invention and which shares co-inventorship with the present invention.

The entire teachings and contents of the above two (1 and 2 above) referenced Applications are hereby incorporated by reference herein in their entirety.

BACKGROUND OF THE INVENTION

Conventional automation control and data acquisition systems typically include one or more sensing or control devices that are capable of controlling or obtaining signal measurements from equipment to which they are connected. The sensing and control devices operate under the control of one or more processing units. As an example, a conventional automated data acquisition and control system can be used to control the precise operation of machinery such as that used in the process of semiconductor fabrication.

Continuing the example of fabricating semiconductor devices, such a process involves accurately controlling a complex arrangement of heating and cooling machinery, semiconductor wafer conveyance systems and chemical vapor deposition system hardware (valves, gas and pressure measurement devices, thermocouples, and the like). Each element of the semiconductor fabrication system (i.e., each temperature sensing device, valve, mechanical manipulator, pressure sensor, thermocouple, etc.) can include an attached sensing and/or control device that is capable reading and writing data (e.g., analog and/or digital control signals) to and from that element. The control devices are coupled to a central processing unit that orchestrates their operation in a prescribed sequence. The central processing unit thus precisely controls the operation of the various elements in the system to allow the elements to work together in a prescribed manner for fabrication of semiconductor devices. Semiconductor fabrication is only one example of a typical use for an automation control and data acquisition system.

Within a conventional data acquisition system, the processing units are typically coupled to the sensing and control devices by standardized networking cables such as category-five (CAT 5) networking cables or other wires, lines, data links or the like. In such systems, the central processing unit exchanges data with the sensing and control devices using a standardized network protocol such as the Transmission Control Protocol (TCP) and Internet Protocol (IP) or TCP/IP. TCP/IP provides a reliable mechanism to exchange packets of data between the processing unit and control devices without having to worry about loss of data packets or networking transmission errors.

Typical conventional data acquisition systems can operate the TCP/IP protocol over an Ethernet network medium that utilizes, for example, standard 100-Base-T Ethernet hardware controllers within the communication ports of the central processing unit and the sensing and control devices. Such standardized Ethernet hardware operates a carrier sense multiple access with collision detection (CSMA/CD) protocol in order to detect packet transmission collisions within the network medium between devices. Using this protocol, when a network device is transmitting onto network medium, the Ethernet hardware continues to listen to the network. If another node tries to transmit at the same time, then the CSMA hardware detects a collision. The CSMA hardware then considers both transmissions from both network nodes to be corrupted and this protocol deletes any data received by recipient devices from the receiving queue that stores incoming packets. After collision detection, both network nodes wait a random period of time before attempting to again retransmit the same packets. Thus, CSMA/CD is stochastic in its nature. In addition, this protocol avoids upper layer protocols such as TCP/IP from having to be concerned with situations in which two or more devices attempt to transmit onto a network medium at one time. Other conventional protocols such as carrier sense multiple access with collision avoidance (CSMA/CA) operate in a similar manner but decrease the number of potential collisions.

SUMMARY OF THE INVENTION

Conventional techniques for controlling the transmission of messages in data acquisition and control systems that utilize conventional networking technologies such as TCP/IP and CSMA/CD or CSMA/CA suffer from a variety of deficiencies. In particular, in many data acquisition or automation control system applications, there may be a real-time requirement for the acquisition of data and/or for the precise control of an element in the system in precise time constraints. Since conventional systems rely on TCP/IP and CSMA/CD or CSMA/CA protocol communications to perform the exchange of messages between, for example, a central controller and devices within the data acquisition system, it can be difficult to achieve true or hard real-time communications (i.e., the fastest performance) due to overhead constraints imposed by TCP/IP and CSMA/CD or CSMA/CA. In addition, conventional data acquisition systems that utilize standard data communications protocols use and CSMA/CD or CSMA/CA protocols within their Ethernet hardware that is not designed for hard-real-time performance. This is due in part, as noted above, to the network arbitration performed in order to perform collision avoidance or collision detection using CSMA/CD or CSMA/CA. True or hard real-time response is possible only when there are no collisions on the network and since these protocols use a random wait strategy to re-transmit packets in the event of collisions, the performance of collection of data in real-time is limited. Accordingly, conventional data communications protocols used to perform data acquisition and control suffer from underlying communications flaws built-in to standardized networking protocols.

As a specific example, during the process of performing semiconductor fabrication, an automation control system may require the ability to precisely control opening and closing of one or more valves in a certain prescribed order and under precise time constraints (e.g., action in system taken as soon as possible after deciding action is required) so as to able to accurately control, for example, deposition of a chemical vapor as a molecular layer onto a semiconductor substrate material. A conventional automation control system operating such equipment may use feedback from pressure or temperature sensors in order to determine when valves are to be opened or closed. For instance, the automation control system may continually read a pressure sensor coupled to a gas chamber and may require that a valve providing the gaseous vapor be closed as quickly as possible when the gas vapor pressure in a chamber deposition area reaches a predetermined threshold. Conventional data acquisition (e.g., pressure sensing) and automation control systems (e.g., to control valve operation) that utilize TCP/IP and/or and CSMA/CD or CSMA/CA data communications techniques for receiving communications signals regarding sensing temperature and/or pressure and in response, for sending signals to manipulate a valve assembly, can be limited in their ability to precisely control, in real-time, the precise sensing and subsequent valve operations.

This is due in part to the fact that processing cycles are required to perform TCP/IP data communications processing during the exchange of messages between a central processing system and one or more sensing and/or control devices. The processing overhead associated with TCP/IP and CSMA/CD or CSMA/CA communications can impose a significant burden on real-time operational requirements of the central processing unit as well as on each sensing and control device. This burden can result in non-real-time (referred to herein as soft real-time) actual performance when true real-time (or hard-real time) performance is actually required for optimal outcomes.

As another example, certain laboratory experiments on animals may include a requirement to send and receive analog or digital signals extremely rapidly to and from a transducer probing device. Medical experiments performed using living mice may include disposing a small needle-like probe into or nearby active brain tissue of a living mouse. The end of the probe may include numerous emitters and receivers of analog and/or digital electrical signals each with a coupling to data acquisition sensing and stimulus elements. These transducer control elements may in turn be coupled via a network to a central processing unit or controller located elsewhere in a laboratory setting. The central processing unit can provide stimulation of (i.e., output to) the emitters of the probe by sending signal commands to the sensing elements for conversion into, for example, analog signals to be transmitted to the tip of the probe to stimulate the brain of the mouse. Likewise, receivers disposed on the probe can actively sense electrical reactions occurring within the brain of the mouse that are detected and accumulated in the sensing element as response data. The central processing unit can send signaling commands to the sensing element in order to actively read the electrical stimuli sensed by the probe within the brain of the mouse.

Since requirements for such experiments include a real-time (i.e., the fastest possible) capability to interact with the probe, data acquisition systems that rely on conventional network protocols and technology may not be capable of producing required response times. Accordingly, conventional data acquisition systems that rely on TCP/IP and CSMA/CD or CSMA/CA communications for the transmission of signaling commands to and from the sensing and receiving elements in such medical experiments can fail to provide adequate transmission rates for the real-time detection of certain conditions occurring within the mouse's brain. This is due in large part to the overhead required for performing TCP/IP and conventional network processing (e.g., CSMA/CD or CSMA/CA processing) required for transporting the signaling commands between the processing unit and the sensing and receiving elements.

In addition, conventional data acquisition and control systems are relatively inflexible in that they implement signal timing techniques within the application layer. In other words, any timing control of commands and responses, if provided at all in such systems, is dealt with in the data acquisition and control application itself, rather than at the network level. As such, due to the limitations noted above, it becomes difficult using conventional systems to provide variations in timing patterns used to send and receive commands between a central processing unit and one or more signaling elements according to different timing patterns while still achieving true or hard real time performance in a data acquisition and control system.

To illustrate this point, if a CSMA/CD or CSMA/CA network arbitration algorithm happens to determine that the network medium is currently being used for communication between, for example, the processing unit and another sensing element, a sensing element that requires immediate (i.e., real-time or the fastest possible) transmission of a signaling command back to the central processing unit will have to wait a predetermined or random amount of time before again attempting to transmit the packet of information back to the central processing unit. This is because the control or data acquisition application does not control when an actual packet of data is transmitted onto the network. Rather, the packet is passed from this application down to a conventional layered networking system including transport, network, data link and physical layers which are then responsible for transporting the packet as fast as they are able to do so (using conventional techniques) between a source and destination over the network. However, since such conventional networking capabilities do not provide for true real time communications, the wait or delay that may be incurred, for example in establishing a TCP connection or in negotiation arbitration of the network medium in the event of a collision can have a significant impact on the ability to perform real-time communications between the application and a sensing or control device.

Embodiments of the present invention significantly overcome these and other deficiencies found in conventional data acquisition and control systems. In particular, embodiments of the invention provide mechanisms and techniques that operate within a data acquisition and control system to provide a communications protocol between a central controller and a set of modules networked to the central controller that are used for controlling device within the data acquisition and control system. As an example of such a system, a central controller can be networked to a set of modules and each module can be responsible for controlling one or more sensing or control device (e.g., laboratory devices, probes, valves, machinery, sensors, etc.). Using the techniques explained herein, the central controller sends and receives commands and data to and from the modules. A user operating a data acquisition or control application (e.g., a software program) within the central controller can configure such an application to provide a list of commands (referred to herein as a channel list of commands) to be sent to and executed by the modules networked to the central controller. As an example, a channel list command sent from the central controller to a particular module networked to the central controller may instruct that module to output certain analog or digital signals to a device coupled to that module and may further instruct the module to read certain signals from that device and return the data read in one or more response messages.

Once the channel list is configured with the appropriate commands to "exercise" (i.e., send data to and receive data from) the modules, embodiments of the invention operating in both the central controller and the modules operate to provide efficient and flexible communications (i.e., the transport of request and response messages) between the central controller and the modules. Embodiments of the invention are referred to herein as a Data Acquisition-Basic Input Output System or "DAQ-BIOS".

According to various embodiments of the DAQ-BIOS of the present invention, the system allows communication between a central controller and a number of modules using different timing patterns depending upon the purpose or application of the data acquisition or control system. For example, according to one embodiment of the invention, the DAQ-BIOS operating in the central controller can utilize a fixed timing pattern in order to send one or more commands to one or more modules in sequence, one module at a time. Upon receipt of a request message containing a command by a module to which that request message is addressed, the module can immediately process the command and can return a response message back to the central controller. Then, at the next time slot for the next module in the fixed timing pattern, the DAQ-BIOS can repeat the process and can proceed to communicate with the next module in the sequence (as defined by the channel list of commands). In this manner, a fixed timing pattern provides respective time slots for each module during which the central controller can create and transmit respective request messages containing at least one command to a particular module and can receive a response message from that module. After the time slot for one module is complete, the central controller can continue performing commands defined within the channel list in order to communicate with other modules either in the fixed or a variable timing pattern (explained below).

According to another embodiment of the invention, the DAQ-BIOS operating in the central controller can utilize a variable timing pattern in order to send one or more commands in a single (e.g., bundled) request message to a plurality of the modules networked to central controller in a multicast or broadcast fashion. Each command set for each different module in a single request message can indicate, for example, a time at which that particular module is to respond to the command(s) within the request message directed to that particular module. In addition, the request message can indicate an amount of data that each module is to return in one or more response messages in response to processing the command(s) for that module. In this manner, the variable timing pattern allows embodiments of the invention, for example, to provide a command or commands to one module that may cause that module to produce a response message at a particular defined time with, for example, a large amount of response data, whereas other commands in the same request message are designated for processing by a different module and cause this other module to respond at a different time with a lesser amount of data. The variable timing pattern thus allows a wide variety of scenarios to be created which allow data acquisition and control from different modules networked to the central controller according to different needs or requirements concerning time of response and amount of data received.

In addition, embodiments of the invention can provide true or hard real time response (i.e., can acquire data from and control modules in a real-time manner, as quick as possible) with or without the use of conventional transport and network layer protocols such as TCP/IP and without collision detection and avoidance mechanisms such as those found in CSMA/CA or CSMA/CD. In particular, in one embodiment of the DAQ-BIOS system of the invention does not require TCP/IP. In this embodiment, data acquisition and control is performed in true or hard real time by encapsulating request and response messages containing channel list module commands (or data produced in response to processing such commands within one or more modules) using only Ethernet frames and link layer data communications. By avoiding the use of transport and network layer protocols, DAQ-BIOS provides its own timing patterns and network arbitration techniques as explained herein in order to avoid collisions of messages transmitted over the network between the central controller and the modules. As such, not only do these embodiments of the invention do away with the requirement to utilize cumbersome and time-consuming transport layer protocols such as TCP/IP, but since these embodiments of the invention provide network control on their own, including timing patterns that govern when the network is to be used for transmission of messages by either the central controller or specific modules, the performance of a data acquisition system configured with embodiments of the invention can significantly exceed that of conventional data acquisition and control systems with respect to amounts of time required to collect and process data in a real-time manner.

By way of example, using fast Ethernet 100 Mbps link layer networking technology, one embodiment of the invention can use either a fixed or variable timing pattern without the use of conventional TCP/IP or collision avoidance mechanisms. The central controller can thus encapsulate request messages sent to modules and response messages received from modules in Ethernet frames without requiring the use of TCP/IP connection establishment mechanisms or network arbitration schemes such as CSMA/CA or CSMA/CD. Accordingly, since embodiments of the invention provide complete control over when messages are sent and received by the central controller and the modules, signaling to and from modules can take full advantage of the 100 Mbps throughput of a fast Ethernet network without incurring the overhead associated with complex TCP/IP connection establishment messages (e.g., TCP SYN, SYN ACK and SYN ACK ACK sequences) and complex error correction and retransmission scenarios (e.g., CSMA/CA or CSMA/CD) since collision avoidance is handled by the DAQ-BIOS system of the invention.

Other embodiments of the invention allow the operation of DAQ-BIOS over networks such as conventional Ethernet networks (e.g., the Internet or a dedicated or non-dedicated Local Area Network) that use TCP/IP, without effecting the operation of the TCP/IP protocol stack. That is, DAQ-BIOS as explained herein can operate over conventional networks, but due to overhead processing requirements associated with TCP/IP, there may be no guarantee of hard real-time response. Accordingly, the processing techniques explained herein to send and receive request and response message between the central controller and the modules according to fixed or variable timing patterns can operate over standard networking protocols without effecting their operation. In such cases, the DAQ-BIOS in the central controller and the modules communicates as an application to the TCP/IP layers, as any application that needs to send or receive data over a network. There may or may not be other devices besides modules and the central controller on such a network. However, due to the processing associated with TCP/IP and the potential for collisions of data packets, embodiments that operate in this manner do not guarantee hard (i.e., the fastest) real-time response. Such embodiments are useful however, when a separate dedicated network medium is unavailable or when modules and the central controller may be separated in distance so as to require networking equipment such as switches and/or routers to propagate communications between the central controller and/or the modules.

More specifically, certain embodiments of the invention operate in a central controller and provide a method for performing acquisition of data from a set of modules networked to the central controller. One such method comprises the steps of obtaining at least one command to be sent to at least one module of the set of modules networked to the central controller. The method them composes a request message containing the command(s). The request message has an associated timing pattern selected from a plurality of available timing patterns. Timing patterns can include a fixed timing pattern that shares request and response time between each module during a request response sequence in a time sliced manner or a variable timing pattern that provides a request message to modules that indicates when those modules are to respond to the request message and that indicates an amount of return data to be returned from each module in a response message from that module. The method then transmits the request message to the module(s) of the set of modules according to the associated timing pattern and receives, according to the associated timing pattern, a response message from the module(s) of the set of modules.

In another embodiment, the associated timing pattern is a variable timing pattern and the step of composing a request message comprises the steps of determining a response time for the at least one command. The response time defines when a module to which the command is directed is to respond to the command. The method also selects an amount of return data to be returned in a response message from the module to which the command is directed and assigns the response time and the amount of return data to the command in the request message. Accordingly, the step of receiving a response message receives the response message from the module to which the command is directed at a receipt time related to the response time. The response message contains data no greater than the amount of return data assigned to the command.

In another embodiment, the step of obtaining at least one command comprises the step of obtaining at least one respective command for a plurality of respective modules in the set of modules. The step of determining a response time for the command comprises the step of determining a respective response time associated with each respective module. Each respective response time indicates when the module to which that response time is associated is to respond after processing the command obtained for that module. Also, the step of selecting an amount of return data comprises the step of determining a respective amount of return data to be returned from each respective module in response to processing the command and the step of composing a request message comprises the steps of combining the command, the respective response time and the respective amount of return data for each of the respective modules into the request message. Furthermore, the step of transmitting the request message transmits the request message containing at least one respective command for multiple respective modules from the set of modules networked to the central controller.

In another embodiment, the step of combining the command for the plurality of respective modules sequentially inserting each command associated with a respective module into a data portion of the request message. The method then inserts a module offset into the data portion. The module offset indicates where in the data portion of the request message the command for a respective module begins in the data portion. This embodiment repeats the steps of sequentially inserting each command and inserting a module offset until all commands for each respective module are inserted into the data portion of the request message and module offsets are inserted into the data portion indicating where a command begins for a particular module of the plurality of modules.

Another embodiment repeats the step of receiving a response message in order to receive a response message from each module for which at least one respective command was obtained and was combined in the request message. As such, using a single request message, responses from many modules may be obtained, with each module responding at is designated response time and with its designated amount of return data.

A further embodiment repeats the steps of obtaining, composing, transmitting and receiving for a plurality of different modules in the set of modules networked to the central controller such that each repeated step of transmitting transmits a single request message containing commands for different modules, and such that each repeated step of receiving receives a response message from each of the different modules for which the transmitted request message contained at least one command. This forms a bundled request message and for each one, each module responds with a predetermined amount of data at a predetermined response time. Since the response time is selected by the DAQ-BIOS in the central controller, there is no need to use error correction protocols such as those employed in TCP/IP nor is there a need to do collision avoidance such as provided in conventional CSMA/CA or CSMA/CD protocols. This allows the DAQ-BIOS to do all packet scheduling on the network and thus more of the total available bandwidth is useable for transfer of data between the central controller and the modules. Performance is thus significantly increased over conventional data acquisition and control systems.

In another embodiment, the step of receiving comprises the steps of detecting that the response message indicates that additional data is available from a responding module that originated the response message. The method transmits a second request message to the responding module. The second request message contains at least one command to retrieve the additional data from the responding module. The method also receives a second response message from the responding module. The second response message contains the additional data from the responding module. This can also be repeated until all data is obtained from a module using request and response messages. The module can indicate when more data, or no more data, is available via a flag or other indicator in a response message.

In yet another embodiment, the step of receiving further comprises the step of repeating the steps of detecting, transmitting a second request message and receiving a second response message until the step of detecting indicates that no more additional data is available from the responding module. In this manner, multiple response messages can be obtained from a module to obtain all data available.

In a further embodiment, the associated timing pattern is a fixed timing pattern and the step of obtaining a command comprises the step of obtaining a command for a single module of the set of modules networked to the central controller. The step of transmitting the request message comprises the step of transmitting the request message containing the command to the single module during a time slot assigned to that single module and the step of receiving a response message comprises the step of receiving a response message from the single module during a response time slot assigned to that single module. In this manner, requests and responses are received module by module.

One embodiment repeats the steps of obtaining, composing, transmitting and receiving for a sequence of different modules in the set of modules networked to the central controller. As such, in response to each repeated step of transmitting, each of the different modules in the sequence receives a request message containing the command(s) for that module and each module processes the command(s) and responds during a time slot assigned to that module.

In another embodiment, a transmit time between repeated steps of transmitting a request message is greater than a response time between successive steps of transmitting and receiving a response message for a single module. As such, each module to which a request message is transmitted is capable of providing a complete response message during a time slot assigned to that module prior to a next step of transmitting.

In another embodiment, one of the repeated steps of receiving a response message comprises the step of detecting a network error in one of the repeated steps of transmitting and receiving. This method embodiment also comprises the step of, waiting, in response to the step of detecting a network error, for a delay time slot to expire after performing the step of transmitting to a last module in the sequence of different modules before repeating the steps of obtaining, composing, transmitting and receiving. In this manner a response message can be received from a module affected by the network error.

In another embodiment, the step of obtaining at least one command comprises the steps of accessing a channel list to obtain the command. The channel list defines a set of commands to be processed by modules of the set of modules networked to the central controller. Each command in the set of commands identifies an associated destination module and defines an associated operation to be performed by the destination module.

In another embodiment, the associated operation defined by at least one command is a read operation to acquire data from the destination module associated with that command. The data read can be, for example, data from a device that the module is continually collecting. In a further embodiment, the associated operation defined by at least one command is a write operation and the command defines data to be written to the destination modules associated with that command. This allows data to be provided to modules, for example, for output to devices. The data can be, for example, signal data or signal levels (e.g., analog or digital signaling data) to be sent to devices coupled to the modules.

The method embodiments can further comprise the step of processing the response message to acquire data related to at least one module. In this manner, the central controller can continually request data from modules and the modules can respond. Since this is done using network control provided by the DAQ-BIOS, instead of conventional protocols such as TCP/IP, performance is greatly increased. Also, since commands are obtained form a channel list, the channel list allows the ability to setup a "program" of sorts with which to exercise the modules. By arranging the commands in a channel list and by using appropriate timing patterns for the commands, a wide variety of techniques can be used to send and receive data to and from modules and the central controller as may be required. This provides great flexibility in developing data acquisition systems that have unique requirements for obtaining data in different manners from different devices (coupled via modules to the central controller). Since the timing patterns provide collision avoidance and do not require the overhead of TCP connection establishment, speed is also greatly enhanced as compared to conventional systems.

In one embodiment, the step of processing the response message comprises the steps of obtaining response data from the response message produced as a result of the module(s) processing the command(s) in the request message transmitted to that module. The method also provides the response data to either or both of a user extension routine that is capable of processing the response data and/or shared memory that is capable of storing the response data.

In one embodiment, the associated timing pattern is a variable timing pattern and the step of composing a request message composes a request message containing at least one command applicable to multiple modules in the set of modules. Furthermore, the step of transmitting transmits the request message to a multicast address such that each module equipped to receive request messages at the multicast address receives the request message and processes the at least one command contained therein.

In another embodiment, the step of transmitting the request message comprises the steps of creating an Ethernet packet containing the request message and transmitting the Ethernet packet onto a network coupling the central controller and the modules using a non-connection oriented data communications protocol. Thus TCP/IP is not needed.

In another embodiment, the network coupling the central controller and the modules is a dedicated network and the step of transmitting the Ethernet packet onto the network comprises the step of interfacing directly with a link layer to transmit the Ethernet packet onto the network such modules that receive the Ethernet packet do not require operation of a connection oriented protocol.

In another embodiment, a module networked to the central controller is coupled to a device from which that module acquires data, and the command transmitted in the request message to the module includes a command to acquire data from the module. The method further comprises the step of repeating the steps of obtaining, composing, transmitting and receiving such that response messages received from modules networked to the central controller return data in real time to the central controller in response to module processing the command.

In a further embodiment, message data can be handled from modules by a user extension routine at the central controller. The central controller (i.e., the DAQ-BIOS) determines if the response message is associated with a user extension routine, and if so, passes response data contained in the response message to the user extension routine, and if not, passes the response data to shared memory. In this manner, the central controller can route message data to either shared memory for use by an application, or to user extension routines.

Other embodiments of the invention are directed to the modules networked to the central controller. One such embodiment operates in a module networked to a central controller and provides a method for providing data acquisition to the central controller. The method comprises the steps of receiving, a request message containing at least one command. The request message indicates a timing pattern selected by the central controller. As an example, the request message may indicate a fixed or variable timing pattern. The method obtains the command(s) from the request message and processes the at command(s) in the module. The method then transmits a response message to the central controller in response to processing the command(s). The response message is transmitted according to the timing pattern specified by the request message.

In a related embodiment, the timing pattern selected by the central controller is a variable timing pattern and the step of receiving comprises the steps of interfacing directly with a link layer in the module to receive an Ethernet packet from the network such that the module does not require operation of a connection oriented protocol (e.g., does not require TCP/IP).

In another module embodiment, the timing pattern selected by the central controller is a variable timing pattern and the step of obtaining comprises the steps of obtains a module offset from a data portion of the request message. The method then traverses command sets in the request message using the offset to locate a command set associated with the module that received the request message. In this manner, when the central controller uses a variable timing pattern to send a bundled request message to the module, the module can figure out what commands in the request message are to be processed by this module from different command sets for different modules in that request message. A multicast address may be used to send such a bundled request message to the modules.

In yet another embodiment, the step of processing the command comprises the steps of processing the command(s) in the module using any input data specified in the command and retrieving any output data to be returned to the central controller from the module for the command. The method also places the output data into a response message up to an amount of data assigned for the module as specified within the request message. In this manner, DAQ-BIOS places as much data as will fit in a return packet for return to the central controller.

In a further embodiment, the step of processing the at least one command further comprises the steps of determining if additional data is available for return to the central controller that cannot fit into the response message. If such additional data is available, the DAQ-BIOS sets an additional data flag to true in the response message. This can indicate to the central controller that the module has more data available and the central controller can consider sending additional request messages to module(s) that respond as having more data available. This may be done, for example, after completion of a response frame (i.e., after completion of a frame in the timing pattern selected. In the case of a fixed timing pattern, before querying the next module, multiple request messages (followed by response messages) can be used to query the same module to "extract" or otherwise obtain all data available at that time (i.e., when that module indicates more data is available). This can continue until the module indicates no more data is available.

Other embodiments of the invention include a computer system, such as a data communications device, computerized device, central controller, module, or other device configured with software and/or circuitry to process and perform all of the method operations noted above and disclosed herein as embodiments of the invention. In such embodiments, the device, such as a data communications device (e.g., a module or a central controller in a data acquisition and/or control system) comprises a communications interface (e.g., a network interface), a memory (e.g., any type of computer readable medium, storage or memory system), a processor and an interconnection mechanism connecting the communications interface, the processor and the memory. In such embodiments, the memory system is encoded with a DAQ-BIOS application that when performed on the processor, produces a DAQ-BIOS process that causes the computer system to perform any and/or all of the method embodiments, steps and operations explained herein as embodiments of the invention. In other words, a central controller computer system, module, or other device that is programmed or otherwise configured to operate DAQ-BIOS techniques as explained herein is considered an embodiment of the invention.

Other arrangements of embodiments of the invention that are disclosed herein include software programs to perform the DAQ-BIOS operations summarized above and disclosed in detail below. As an example, a DAQ-BIOS software control application, that exists on a computer readable medium such as a disk that can be loaded into a central controller or a module is considered an embodiment of the invention. More particularly, a computer program product is disclosed which has a computer-readable medium including computer program logic encoded thereon that, when executed on at least one processor with a computerized device (e.g., within a module or a central controller), causes the processor to perform the DAQ-BIOS operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or within other a medium such as within firmware, a microchip or as microcode in one or more ROM or RAM or PROM or FPGA chips or as an Application Specific Integrated Circuit (ASIC). These software or firmware or other such DAQ-BIOS configurations can be installed onto a computer system, central controller, module, data communications device or other such device to cause such a device to perform the techniques explained herein as embodiments of the invention.

It is to be understood that the system of the invention can be embodied strictly as a software program, as software and hardware, or as hardware or circuitry or as a processor (e.g., an ASIC or FPGA programmed to perform DAQ-BIOS operations). The features of the invention, as explained herein, may be employed in devices and software systems such as those manufactured by United Electronic Industries of Canton, Mass.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide mechanisms and techniques that operate within a data acquisition and control system to provide a communications protocol between a central controller and a set of modules networked to the central controller that are used for controlling device within the data acquisition and control system. The DAQ-BIOS communications mechanisms and techniques explained herein allow hard real-time acquisition of data, or control of devices, according to different timing patterns thus providing flexibility in the use of the data acquisition and control system to acquire data and control devices in a variety of different situations. In addition, certain embodiments of the invention provide communications between a central controller and a set of modules networked to the central controller without the use of conventional transport layer protocols (e.g., TCP/IP) and without associated connection establishment techniques and error correction mechanisms (e.g., without CSMA/CA or CSMA/CD). It is to be understood however that other embodiments of the invention can operate DAQ-BIOS between a central controller and modules over a network that does use TCP/IP or similar network and transport layer protocols. Is such other embodiments however, there is no assurance of hard real-time response.

Figure 1:
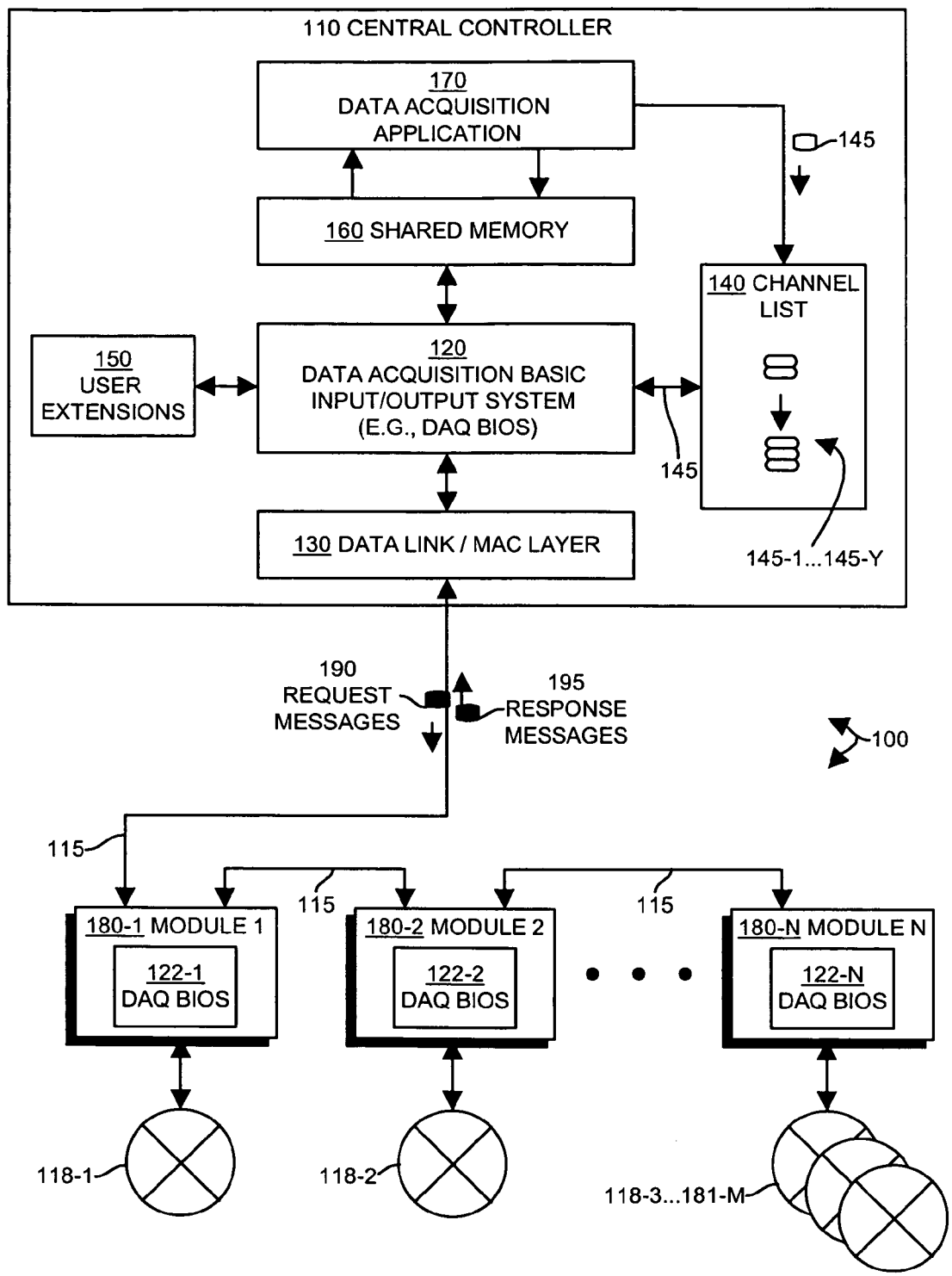
FIG. 1 illustrates an example data acquisition and control system environment including a central controller and a plurality of modules that operate DAQ-BIOS configured according to embodiments of the invention.

FIG. 1 illustrates an example of a data acquisition and/or control system 100 that is suitable for use in explaining example operations of embodiments of the invention. The system 100 includes a central controller 110 coupled via a network medium 115 to a plurality of modules 180-1 through 180-N. Each module 180 is capable of controlling and communicating with one or more devices 118-1 through 118-M. The devices 118 can be any type of equipment, sensors, actuators, machinery or other such elements to or from which the modules 180 may send and receive one or more signals such as digital and/or analog data signals in order to control the device 118 (or to obtain data there from). The central controller 110 and each module 180 are configured with a Data Acquisition-Basic Input Output System or "DAQ-BIOS" 120 (in the central controller 110) and 122-1 through 122-N (within each module 180-1 through 180-N) that operates according to embodiments of this invention. The DAQ-BIOS 120 and 122 components communicate with each other to send request messages 190 (from the central controller 110 to the modules 180 in this example) and response messages 195 (from the modules 180 to the central controller 110 in this example) to allow the central controller 110 to send and receive data and/or commands 145 to and from (and thus control) the operations of the modules 180 and device 118 attached thereto as explained herein.

In addition to the DAQ-BIOS 120, the central controller 110 also includes, in this example, a data link or Machine Access Code (MAC) communications layer 130 which the DAQ-BIOS 120 uses to send and receive requests and response messages 190, 195 onto the network 115, as will be explained. The DAQ-BIOS 120 within the central controller 110 further interfaces in this example with a channel list 140, a set of user extensions 150 and a shared memory 160. A data acquisition application 170 operates on the central controller 110 and is capable of accessing data within the shared memory 160 and can provide sequences of commands 145 (e.g., 145-1 . . . 145-Y) to the channel list 140.

According to the general operation of the data acquisition and control system illustrated in FIG. 1, to begin a process of data acquisition or control of the devices 118, a user (not specifically shown) controlling the data acquisition application 170 can configure the channel list 140 with a sequence of commands 145-1 through 145-Y to be performed (e.g., executed) within the modules 180. As explained in the formerly referenced Provisional Patent Application, a channel list command 145 within the channel list 140 can indicate a destination module 180 (e.g., via an address specifying one or more modules) within which that command 145 is to operate (i.e., is to be processed or executed) and can further indicate data, signals or other information to be sent from the central controller 110 to the module 180 (e.g., for transmission or control of the devices 118 coupled to that specific module 180). A command 145 in the channel list 140 can also specify data, signals, or other information to be retrieved or read from a module 180 (possibly more than one) to which that command is associated. Sets of commands 145 in the channel list 140 can also have associated timing patterns. As an example, a first group of commands may all have an associated variable timing pattern wherein a bit, field or other command indicator in the command 145 designates this command as having the variable timing pattern. These commands are typically arranged in sequential order and identify modules that are to execute these commands. Other commands in the channel list 140 designate have, for example, a fixed timing pattern. It is up to the user/programmer to arrange the commands in the preferred order. It may be that all commands in the channel list use a fixed timing pattern or that all use a variable timing pattern or that some use fixed while others use variable. The DAQ-BIOS 120 is capable of accessing the channel list 140 to obtain commands and can send these commands, according to their timing patterns, to the modules 180 as explained below. The DAQ-BIOS 120 in one embodiment treats the channel list 140 as a circular queue of commands 145 and when it reaches the end (e.g., command 145-Y), it returns to the top of the channel list 140 (e.g., command 145-1) to continue command processing. This can continue until the data acquisition application 170 causes the DAQ-BIOS 120 to stop (e.g., via communication with the DAQ-BIOS 120 via the shared memory 160).

Once the channel list 140 is configured with a sequence of commands 145-1 through 145-Y, the data acquisition application 170 causes the DAQ-BIOS 120 to begin execution of the channel list 140. This causes the DAQ-BIOS 120 to perform as will be explained herein to obtain commands 145 from the channel list 140 and create request messages 190 that are transmitted onto the network 115 for receipt by the modules 180. The DAQ-BIOS components 122 operating within the modules 180 receive the request messages 190 containing the commands 145 (and possibly other data) from the channel list 140, process the commands 145 to either input or output data to or from the devices 118, and return response messages 195 back to the DAQ-BIOS 120 operating within the central controller 110.

In preferred embodiments of the invention, the modules 180 are under the control of the central controller 110 and thus the DAQ-BIOS 120 that operates within the central controller 110 controls which request messages 190 are transmitted to the modules 180 based on the commands 145 in the channel list 140. Accordingly, the DAQ-BIOS components 122 operating within the modules 180 operate as "slaves" to the DAQ-BIOS 120 operating in the central controller 110 and each module responds to those request messages 190. A request message 190 can, for example, instruct a module 180 to output a certain signal at a certain level to one or more devices 118. In response to a request message 190, the DAQ-BIOS 122 in a module 180 can perform the required processing and can return a response message 195 back to the central controller 110 containing, for example, signaling data that may have been requested by a command from a request message 190. In another embodiment, asynchronous events can be sent from the modules 180 to the central controller 110 using response message 195, as will be explained.

Specific details concerning the operation of the DAQ-BIOS components 120 and 122 as configured according to embodiments of the invention will now be explained with respect to the processing steps illustrated in FIG. 2 (DAQ-BIOS operation in the central controller 110) and FIG. 3 (DAQ-BIOS operation in the modules 180) and with respect to the example data acquisition system 100 discussed above with respect to FIG. 1.

Figure 2:
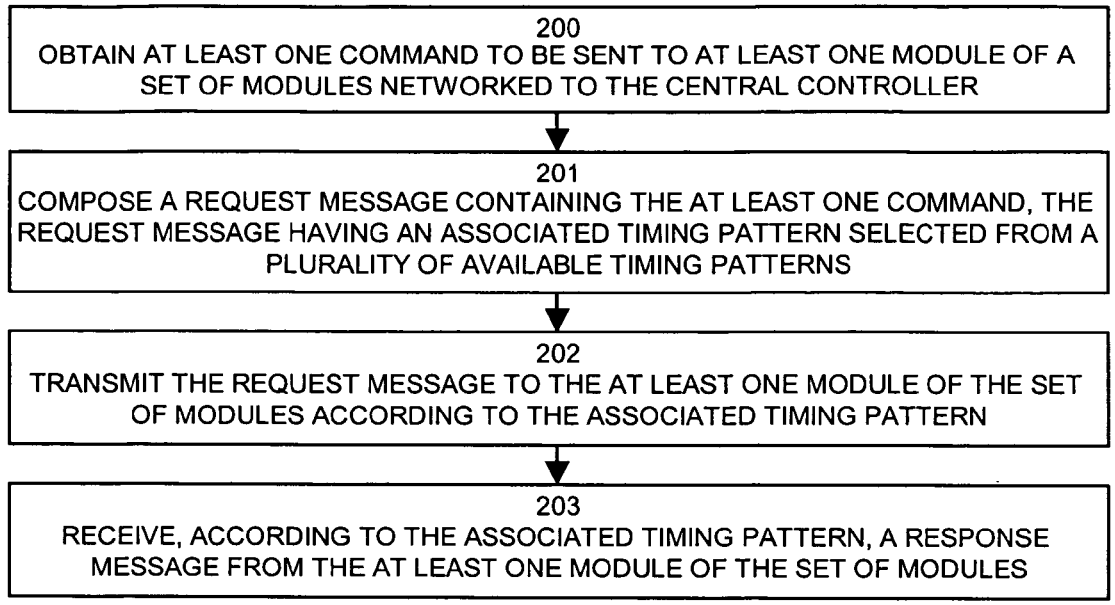
FIG. 2 is a flow chart of processing steps performed by DAQ-BIOS within a central controller configured according to one embodiment of the invention.

FIG. 2 is a flow chart of processing steps that illustrate an example of processing of the DAQ-BIOS 120 operating within a central controller 110 according to one embodiment of the invention.

In step 200, the DAQ-BIOS 120 obtains at least one command 145 (e.g., from the command list 140) to be sent to at least one module 180 of the set of modules 180-1 through 180-N networked to the central controller 110.

In step 201, the DAQ-BIOS 120 operating within the central controller 110 composes a request message 190 containing the command 145 (i.e., one or more commands obtained in step 200). The request message 190 has an associated timing pattern selected by the DAQ-BIOS 120 from a plurality of available timing patterns. The timing pattern may be specified by the command 145 obtained from the channel list 140.

As explained briefly above and as will be explained more thoroughly herein, according to embodiments of the invention, available timing patterns can include a fixed timing pattern that shares request and response time between each module 180 during a request response sequence (i.e., a request message 190 from the central controller 110 followed by a response message 195 from a specific module 180) in a time sliced manner such that each module 180 processes a request 190 and provides a response 195 within its designated time slice and then the DAQ-BIOS 120 can repeat this process for the next module. The DAQ-BIOS can determine a sequence of modules to which commands are sent in a fixed timing pattern by the arrangement of commands 145 within the channel list 140. The channel list 140 is preferably a sequence of commands 145 that operates in a looping or circular manner such that upon completion of all commands in the channel list 140, the DAQ-BIOS 120 returns to the top of the channel list 140 to again process the sequence of commands 145. In this manner, continuous operation of commands within the modules 180 is achieved.

In another embodiment of the invention as will be explained in the more detail shortly, the DAQ-BIOS 120 provides a variable timing pattern that provides a request message 190 containing commands 145 for more than one module 180 (e.g., sent via a broadcast address) and the respective command set within this variable timing request message 190 for a particular module 180 indicates when that module is to respond to that request message 190 and further indicates an amount of return data to be returned from that module 180 in the response message 195 from that module. In other words, in a variable timing pattern, a single request message 190 can contain one or more commands for multiple modules 180. Each set of commands within this request message 190 can indicate when the respective module 180 to which those commands are to be processed is to respond to the request message 190 with its own respective response message 195. In addition, the request message 190 can identify how much data that particular module is to return to the central controller 110 within its response message 195 at the designated response time. In this manner, multiple commands can be sent to modules 180. The DAQ-BIOS 120 can select module response times such that no module 180 responds during a time at which another module is supposed to respond upon the network 115. In this manner, embodiments of the invention do not require the network arbitration and error correction techniques provided by conventional transport layer protocols such as TCP/IP. As noted above however, embodiments of DAQ-BIOS operate over TCP/IP networks in which case the DAQ-BIOS processes in the modules and central controller interface with the TCP/IP stack as a regular application. These other embodiments however leave open the possibility of non-hard real-time response (i.e., soft real-time) since the TCP/IP processing may induce additional overhead. In addition, such embodiments might operate on networks with other devices attached (i.e., non-dedicated networks) in which case there is a potential for packet collisions that may induce further processing delays. Such embodiments may be useful however in situations where there are large distances between modules and/or the central controller thus requiring the use of data communications devices such as switches and routers on the network to propagate packets.

Next, in step 202, the DAQ-BIOS causes the central controller 110 to transmit the request message 190 to at least one module of the set of modules 180-1 through 180-N according to the associated (i.e., selected) timing pattern (e.g., according to a fixed timing pattern or according to a variable timing pattern). As will be explained in more detail herein, the transmission of message 190 and 195 onto the network 115 uses the data link and machine access code communication layers 130 to frame the request message 190 within an Ethernet frame using MAC addresses for source (e.g., central controller 110) and destination (e.g., one or more modules 180). The DAQ-BIOS 120, 122, according to certain embodiments of the invention, avoids collisions altogether and provides a time slot for any re-transmission requirements for messages and thus TCP/IP and its associated overhead are not required. Accordingly, performance of a data acquisition and control system using DAQ-BIOS as explained herein exceeds that of conventional systems that utilize TCP/IP or similar transport protocol.

After transmission of the request message 190 onto the network 115 for receipt by one or more modules 180, the modules receive and process the request message as will be explained shortly with respect to FIG. 3. In response, the modules 180 return response messages 195 to the central controller 110.

In step 203, the DAQ-BIOS 120 operating within the central controller 110 receives, according to the associated timing pattern selected in step 201, a response message 195 from the module or modules (e.g., multiple replies at designated response times, as will be explained) to which the original request message 190 was transmitted.

In this manner, the DAQ-BIOS system 120 operating in the central controller 110 can utilize one or more timing patterns to transmit request message 190 to the modules 180. As will be explained shortly, the timing patterns and associated request message formats 190 provide enhanced flexibility for data acquisition and control systems and by transmitting the messages on the network without a requirement for utilization of TCP/IP, performance characteristics of the data acquisition system that utilize the DAQ-BIOS system 120 are significantly increased as compared to conventional systems.

Figure 3:
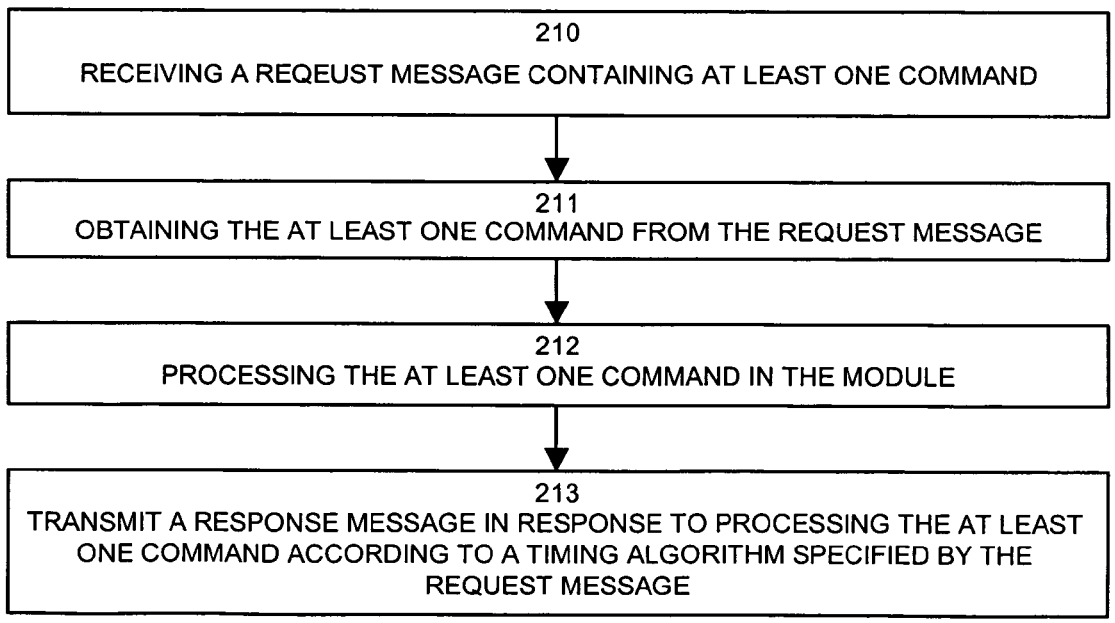
FIG. 3 is a flow chart of processing steps performed by DAQ-BIOS within one or more modules networked to a central controller according to one embodiment of the invention.

FIG. 3 is a flow chart of processing steps performed by the DAQ-BIOS 122 operating within the modules 180 according to one example embodiment of the invention.

In step 210, the DAQ-BIOS system 122 operating within a module 180 receives a request message 190 containing at least one command 145. The request message 190 may have been addressed directly to this module 180 using the fixed timing pattern, or may have been detected by the module 180 via a multicast or broadcast addressing technique in which multiple modules can detect a request message 190 having a single Ethernet address.

Next, in step 211, the DAQ-BIOS system 122 operating in this module 180 obtains the command 145 from the request message 190. As will be explained shortly, the request message format of the request message 190 for a fixed timing pattern includes one or more commands for a single module 180. Accordingly, in step 211 the DAQ-BIOS 122 operating in the module 180 can simply obtain the command at the appropriate (e.g., predefined) location within the request message 190. In an embodiment which uses a variable timing pattern, a request message 190 can include different commands for different modules 180 and thus when a variable timing request message 190 is received by the DAQ-BIOS 122 within module 180, the DAQ-BIOS system 122 can parse or otherwise traverse the contents of the request message 190 in order to locate the appropriate command set designated to be processed by that module 180. In other words, the DAQ-BIOS 122 operating within the modules 180 is capable of locating the appropriate commands within a group of commands designated for multiple modules with a single request message 190 when using the variable timing pattern. Further details on this processing will be explained shortly.

In step 212, once the command is obtained or extracted from the request message 190, the DAQ-BIOS 122 within the module 180 processes the command 145. This can entail extracting signaling information from the command 145 within the request message 190 which can direct the module 180 to output certain signals or other data to one or more devices 118 coupled to the modules 180. In the alternative or in addition to this processing, processing the command 145 can include performing a read operation within the module 180 to sense, read, extract or otherwise gather or collect data from the device 118 for return in a response message 195 to the central controller 110. The exact nature of the command or commands 145 within the request message 190 is not meant to be limiting to embodiments of this invention. To this end, it can be assumed that data can be input to or output from the modules 180 in order to exercise, operate or otherwise control or acquire data from the devices 118 in a hard real-time manner using DAQ-BIOS.

Next, in step 213, the DAQ-BIOS 122 transmits a response message 195 in response to processing the command 145 (step 212) according to a timing pattern specified by the central controller 110. In other words, the DAQ-BIOS 122 transmits the response message 195 at an appropriate predefined response time onto the network 115 such that the response message 195 from this module 180 does not collide or interfere with other messages on the network 115. In a fixed timing pattern, the DAQ-0BIOS 122 can transmit the response message 195 as soon as it is ready. In the variable timing pattern, the DAQ-BIOS can wait until its designated response time arrives, as designated in the command portion for that module as specified in the request message 190.

As an example, when performing request and response message processing using a fixed timing pattern, the DAQ-BIOS 120 causes the central controller 110 to send a single request message 190 to a specific module 180-1 at one time. The DAQ-BIOS 122 within that module 180-1 can immediately (i.e., as soon as possible) thereafter (i.e., after processing steps 210 through 212) respond (step 213) to the request message 190 with a corresponding response message 195 during a time slot of network bandwidth reserved by the central controller 110 for that module's 180-1 response message 195 (the time slot occurring after transmission of the request message 190 to that module). Thereafter (e.g., either immediately after complete reception by the DAQ-BIOS 120 in the central controller 110 of the fixed timing response message 195, or, after expiration of the time slot reserved for reception of the fixed timing pattern response message 195 from the module 180-1), the DAQ-BIOS 120 in the central controller 110 can send a subsequent request message 190 for another module 180-2 onto the network 115 and can await receipt of a corresponding response message 195 during the time slot for response assigned to this other module 180-2. The request-response sequence can continue such that each module 180-1 through 180-N receives a time slot of network bandwidth during which it can receive a request message 190 and can provide a response message 195 in return.

According to the variable timing pattern, a single request message 190 can include commands 145 for multiple modules 180-1 through 180-X (where X can equal N) and each command set within the single request message 190 includes an associated or corresponding response time indicating, to each module 180 containing a command 145 in that request message 190, an associated response time for that particular module 180. The DAQ-BIOS 120 selects the response times for different command sets for different modules to be different within a single request message 190 such that no two modules 180 respond during the same time period on the network 115, thus avoiding collisions and errors. An example of how to compute the response times for a particular module is provided in the example description of details of commands and processing associated with one embodiment of the invention explained in the attached Appendix.

In addition to a response time, the variable timing request message 190 containing commands for multiple modules can specify how much data a particular module 180 is to return in its response message 195, thus providing further control of the utilization of network bandwidth. Accordingly, by specifying a specific response time for a module along with an amount of data that that module 180 is allowed to return to the central controller 110, the DAQ-BIOS 120 provides precise control over the use of the network 115. This results in the ability to provide extremely refined scheduling of transmission resources on the network 115 thus allowing true or hard real-time performance for data acquisition and control.

Figure 4:
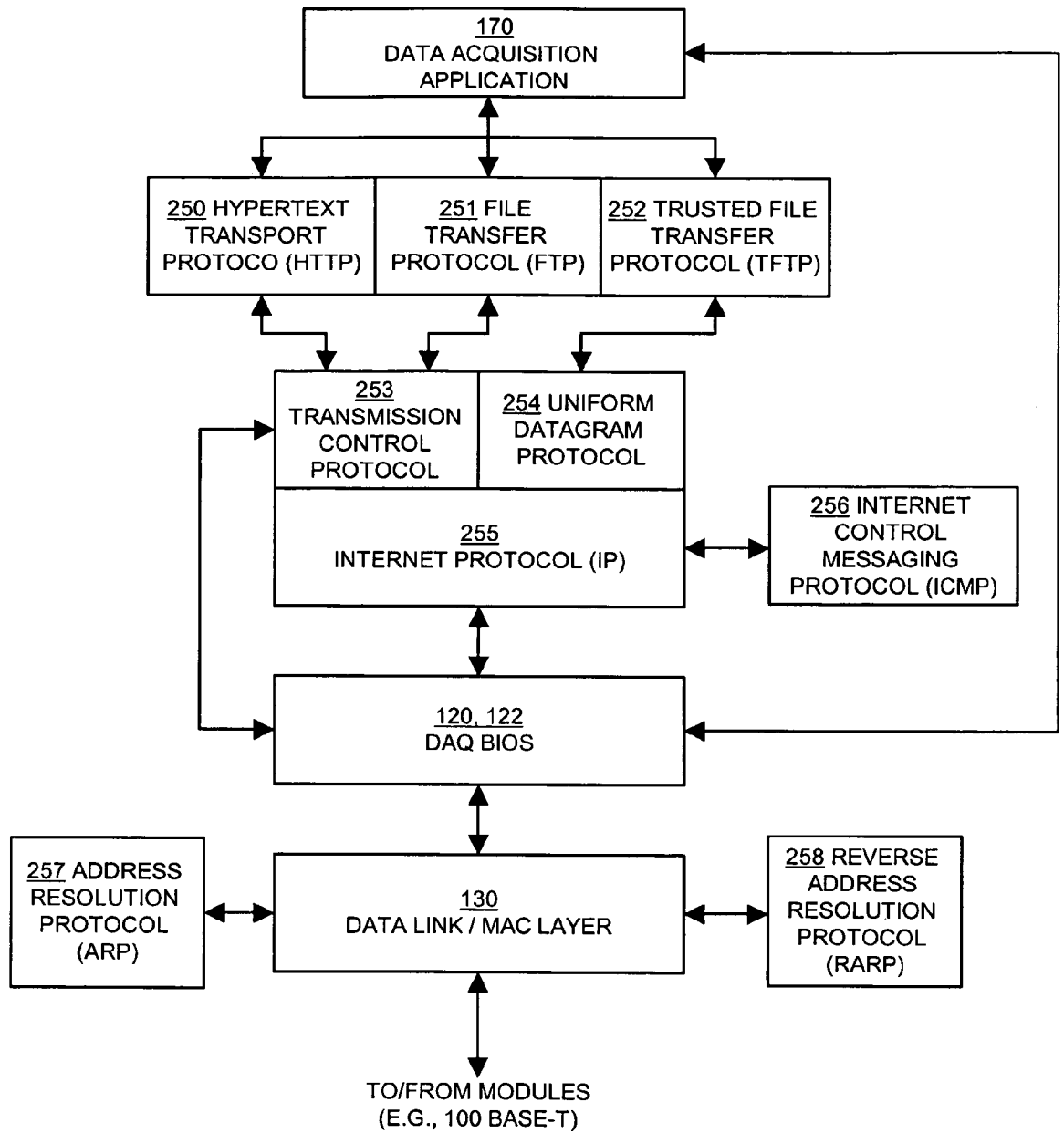
FIG. 4 illustrates a protocol architecture incorporating DAQ-BIOS within a device such as a central controller or module in accordance with one embodiment of the invention.

FIG. 4 illustrates an example protocol architecture that identifies how the DAQ-BIOS system 120 (or 122) of embodiments of the invention relates to other protocols and data communications processes utilized for communication within an example data communications device operating in a data acquisition and control system. In this particular configuration, the DAQ-BIOS 120, 122 resides just above the data link and MAC communications layer 130 and utilizes this layer 130 for encapsulation of request and response messages 190, 195. The MAC layer 130 can interface with an address resolution protocol (ARP) process 257 and a reverse address resolution protocol (RARP) process 258, each of which can be used to transmit Ethernet packets onto the network medium 115. The DAQ-BIOS process 120 within the central controller can also interface directly (e.g., can access the shared memory 160 as illustrated in FIG. 1) to communicate with a data acquisition application 170. In this manner, the DAQ-BIOS 120 in the central controller 110 provides superior real-time performance due to the elimination of the use of TCP/IP 253 in this example embodiment.

It is to be understood that embodiments of the invention are not limited to use of fixed and variable timing pattern without TCP/IP 253. As an example, consider a scenario in which implementations of the data acquisition and control system are configured within a network 115 that contains, for example, other devices beside modules 180 and the central controller 110. This is referred to herein as a non-dedicated network. In such a configuration, it becomes difficult or impossible to guarantee that the network medium 115 is clear for transmission of messages to or from modules 180 and the central controller 110 since the other non-central controller and non-module devices might use TCP/IP and/or CSMA/CA or CSMA/CD. This may be the case because any other devices coupled to the network 115 they have transmission requirements that are not determined by the DAQ-BIOS processes 12122.

Accordingly, for data acquisition and control systems that do not require the optimal in real-time performance, or in other words, that require soft real-time, embodiments of the invention can be implemented in which the DAQ-BIOS processes 12122 resides above the TCP/IP protocol layer 253. In such configurations, the request and response messages 190 in 195 can be encapsulated within TCP/IP packet headers produced by the TCP/Internet protocol layers 253 and 255. In addition, TCP connections may be established between the central controller 110 and each module 180 using the transmission control protocol 253 in order to transmit the request in response messages 190 in 195. Alternatively, UDP 254 could be used but provides no guaranteed delivery. Using such communication mechanisms (i.e., using TCP/IP), the DAQ-BIOS protocol explained herein can still utilize either the fixed or variable timing pattern. However, performance may be degraded due to the overhead required for such things as establishment of TCP/IP connections and Internet protocol and collision avoidance processing. Accordingly, for situations requiring the most optimal real-time performance characteristics (i.e., true or hard real-time) embodiments of the invention that provide a data acquisition application 170 that interfaces directly with DAQ-BIOS 120 which avoids the use of TCP/IP are a preferred implementation.

As also illustrated in FIG. 4, protocols such as the hypertext transport protocol 250 (HTTP), the file transfer protocol (FTP) 251, and a trusted file transfer protocol 252 (TFTP, which utilizes the uniform datagram protocol 254 or UDP), and the Internet control messaging protocol (ICMP) 256 can operate in the architecture as illustrated to exchange messages between the central controller 110 and modules 180 using the DAQ-BIOS 120 and 122.

Figure 5:
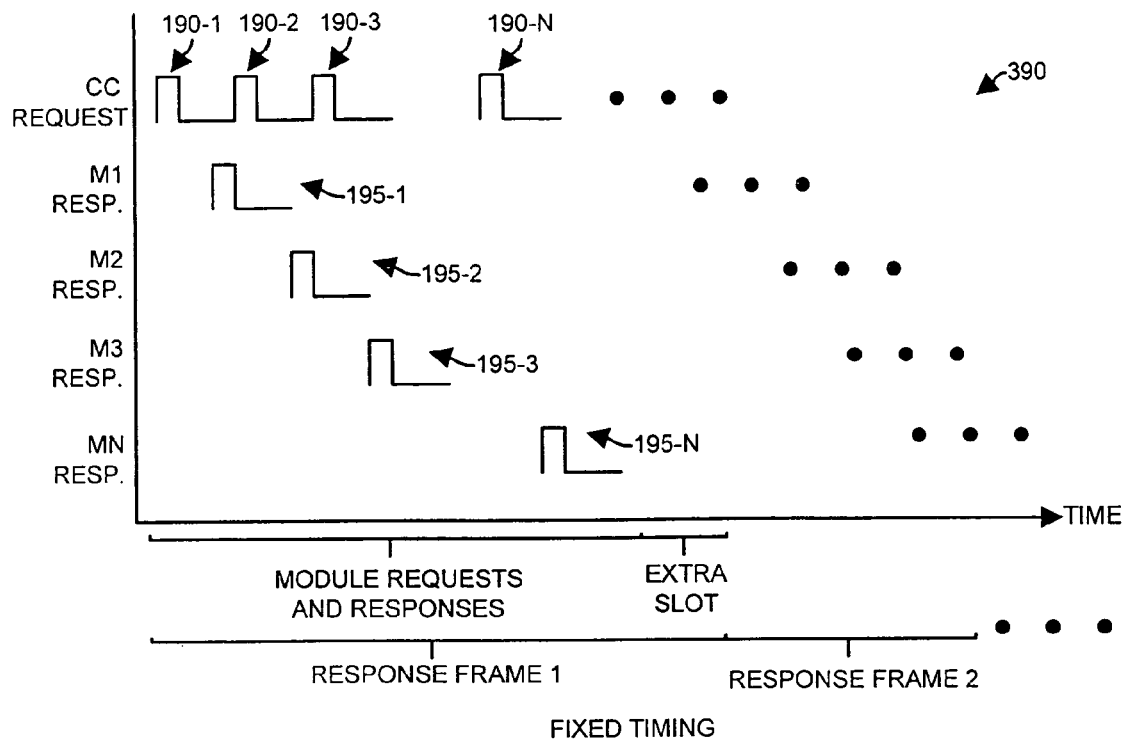
FIG. 5 is a graph that illustrates operation of a fixed timing pattern provided by DAQ-BIOS according to one example embodiment of the invention.
Figure 6:
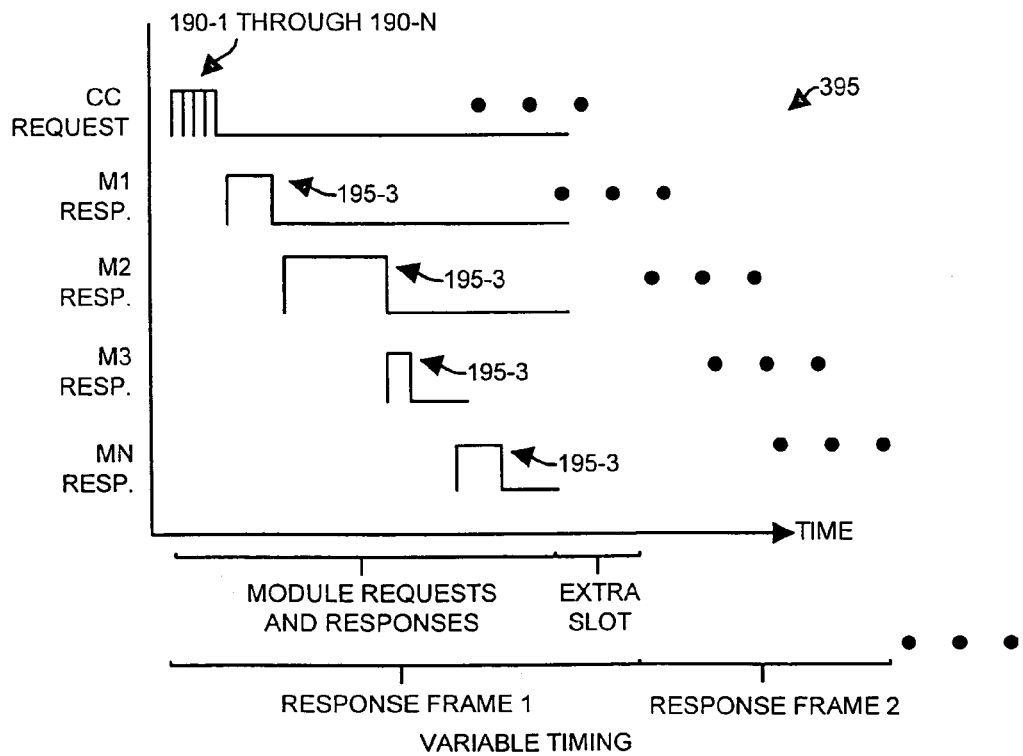
FIG. 6 is a graph that illustrates operation of a variable timing pattern provided by DAQ-BIOS according to one example embodiment of the invention.

FIGS. 5 in 6 illustrate two example graphs of timing patterns that the DAQ-BIOS system 120, 122 of embodiments of the invention can implement to exchange messages between the central controller 110 and the modules 180. Specifically, FIG. 5 illustrates an example of a fixed timing pattern 390 while FIG. 6 illustrates an example of a variable timing pattern 395.

FIG. 5 illustrates an example of the fixed timing pattern 390 as provided by DAQ-BIOS embodiments of the invention. In this example, the top and left of the vertical axis identifies a series of individual request messages 190-1 through 190-N that the central controller 110 transmits to respective modules 180-1 through 180-N. The vertical axis also indicates the signaling and timing pattern of the central controller request message 190 (at the top) and each module response 195, as shown underneath, in successive order.

In this example, each request message 190 in the fixed timing pattern 390 includes one or more commands 145 for a specific respective module 180. As a specific example, the request message 190-1 might contain one or more channel list commands 145 for module 180-1. The request message 190-1 is addressed (i.e., using an Ethernet MAC layer address for optimal performance) on the network 115 for receipt by the module 180-1. After the central controller 110 transmits request message 190-1, a response period of time is provided prior to transmitting the next request message 190-2 (which may be addressed for and contain commands for module 180-2). During this response period of time, module 180-1 provides the response message 195-1. Upon completion of the reception of the response message 195-1 by the central controller 110, the central controller then transmits the request message 190-2 to the next module such as module 180-2. This may be done, for example, after expiration of the response period of time provided by the central controller 110 during which module 180-1 must respond. By setting time between requests 190-1, 190-2, and so forth longer then reply or response time for each module, DAQ-BIOS can be sure that each module will reply in it's designated time slot. This ensures that no collisions happen on the network 115.

As illustrated by the remainder of the fixed timing pattern 390 in FIG. 5, the process of sending individual request messages 190 to specific respective modules 180 and receiving respective response messages 195 from those respective modules to which the request messages 190 were sent continues until all modules 180 have received and responded to the commands defined in the channel list 140.

The fixed timing pattern 390 illustrated in FIG. 5 can perform an entire sequence of request and response messages between the central controller 110 and a series of modules 180-1 through 180-N. This sequence of request and responses is typically defined by the series of commands 145 loaded within the channel list 140 and is illustrated in FIG. 5 by response frames "1", "2" and so forth. Each response frame defines a set of request and response sequences between the central controller 110 and a series of modules 180. In other words, a user who operates the data acquisition application 170 to program the channel list 140 can, in one example, configure the channel list 140 with a series of commands 145 for the sequence of modules to reflect a single pass or sweep of the modules in order to perform data acquisition or control across all modules networked to the central controller. Upon completion of this single pass to each module, the DAQ-BIOS 120 can return to the top of the channel list 140 in order to again repeat the same sequence of commands in an iterative manner.

In the event of an unforeseen network error which corrupts, for example, a single request response sequence between the central controller and an individual module, the fixed timing pattern 390 illustrated in this example embodiment in FIG. 5 can accommodate for such error occurrences by providing an extra slot at the end of the response frame sequence during which the central controller can re-request data from the faulted module (for which a response 195 was corrupted) and can receive an accurate response message. As illustrated, after the final response message 195-N is received from the last module 180-N, in the event of the network error that causes the incorrect reception of a module response message 195 from one of the modules 180 during the module request and response period, the DAQ-BIOS 120 operating within the central controller 110 can wait for a delay time slot or extra slot to expire before repeating the steps of obtaining the next commands from the top of the channel list 140 in composing and transmitting the next series of request and response messages to the set of modules network to the central controller. In other words, the fixed timing pattern illustrated in FIG. 5 can compensate for any potential errors in the sequence of request and response for a particular module by providing extra slot in which to re-request a response message from a particular module affected by the error. Using the extra time slot, the central controller can resend request packets 190 in the extra slot if it has not received a reply response message 195 for a particular module 180 in a designated amount of time. Alternatively, a module that has additional data to send to the central controller can use the extra time slot to transmit this additional or extra data.

FIG. 6 illustrates an example of a variable timing graph or diagram 395 used by the DAQ-BIOS 120 and 122 to transmit request and response messages between the central controller 110 and modules 180. The vertical axis to the left of the variable timing diagram 395 indicates the signaling pattern of the central controller request message 190 at the top and each module response 195 is shown underneath in successive order. The variable timing pattern 395 shares time between modules 180 based on a single bundled request message 190 that uses a multicast or broadcast address such that each module 180 detects the request message 190 containing commands 145 (e.g., containing individual request messages 190-1 through 190-N for each individual module 180-1 through 180-N) applicable to multiple modules 180.

Note that in the variable timing pattern 395, each response message 195-1 through 195-N sent from a respective module 180-1 through 180-N uses a different amount of time to completely respond to the central controller 110. This is because the bundled request message 190 identifies, for each module 180, a response time that indicates a predefined delay by which that particular module 180 is to wait before transmitting its particular response message 195 after receiving the multicast bundled request message 190. One advantage to this technique is flexible bandwidth control since the size of the transmission response time and response size can be adjusted dynamically. Each response message 195 can indicate whether or not a particular module 180 has additional data or information to be transmitted to the central controller 110 during the request response sequence (i.e., during a response frame). As an example, during response frame 1, in the event that a particular module 180-X indicates that additional data is available to be sent to the central controller 110, during the next response frame 2, the central controller can providing bundle request message 192 that allocates additional time for that particular module 180 to respond with a response message 195 and can indicate to that module that additional data should be transferred in net response message to the central controller as compared with the previous response message 195 cents finance a module in a previous response frame.

As will be explained more detail shortly, the central controller determines a response time for the commands process by a module and further selects the amount of return data to be returned in a response message 195 for the module 180. In a return response message 195, a module can indicate if additional data is available for transmission to the central controller 110. This operates like a feedback mechanism to the central controller 110. By adjusting the response time and amount of data values during successive generations of response frames, the amount of data collected for modules can be adjusted, for example, to retrieve more data from some modules and less from others or to increase the amount of data received from a module and producing more data during the processor data acquisition (e.g., during an ongoing experiment, simulation or other situation in which amounts of data vary when produced from different modules). By resizing the response message transmission window, the DAQ-BIOS system can allow more or less data to be transferred either from the central controller 110 to a particular module 180 (i.e., by including more data for this module in the bundle request message 190) or by indicating to that module an increased amount of data to that module can return to the central controller in net particular modules response message 195.

In addition, the bundled request message 192 can indicate when each particular module 195 for which that bundle request message 192 contains at least one commands 145 is to respond. Accordingly, during different response frames, the order in which different modules 180 respond can change. As an example, as illustrated in FIG. 6, the order of module responses in response frame 1 is 180-3, 180-1, 180-2 and 180-N. In a subsequent response frame 2, the DAQ-BIOS 120 can alter this order in a subsequent bundled response message 190.

Figure 7:
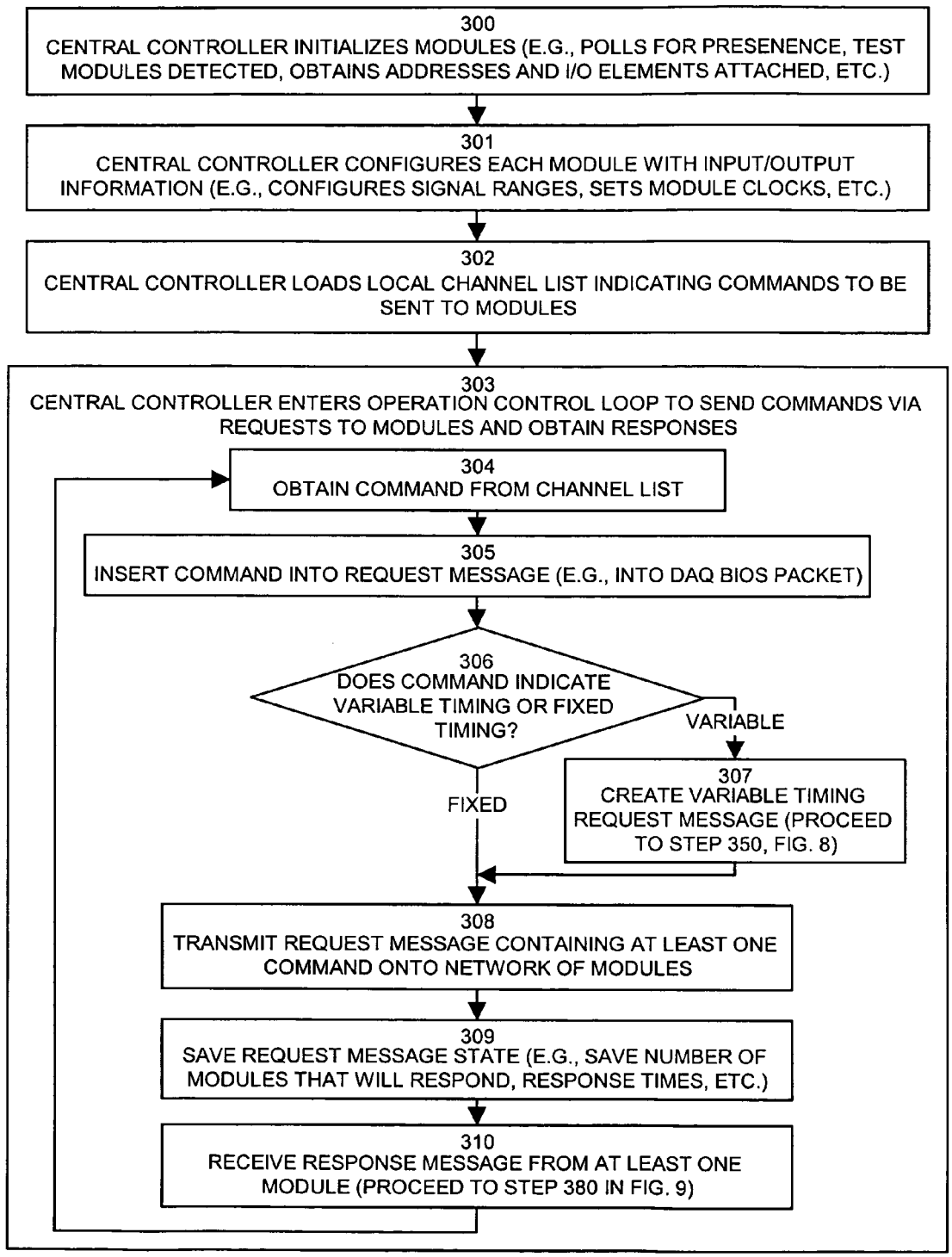
FIG. 7 is a flow chart that illustrates details of processing performed by a central controller configured with DAQ-BIOS according to one example embodiment of the invention.

FIG. 7 is a flow chart of processing steps performed by a DAQ-BIOS 120 operating within the central controller 110 according to one example embodiment of the invention to process request and response messages 190 and 195.

In step 300, the central controller 110 initializes the modules to prepare for processing commands 145 from the channel list 140. As an example, the processing of step 300 can include polling each module for its presence on the network 115 and performing tasks to determine that each module is functioning properly. In addition, DAQ-BIOS can detect each modules address (i.e., Ethernet MAC layer address) and each module can report back to the central controller identifying the various elements or devices 118 couple to that module 180.

Next, in step 301, the central controller 110 configures each module, for example, with input output information to be used during processing of commands 145 from the channel list 140. Configuration of the modules can include configuring signal ranges for signals (e.g., analog and digital signals) to be input and output from the modules 180 to devices 118, setting module clocks and signal timing mechanisms and the like. Once the modules are configured properly, processing proceeds to step 302. Example operations related to step 300 and 301 are provided in the Appendix that described functions used in an example implementation of one embodiment of the invention.

In step 302, the central controller loads the channel list 140 indicating the commands 145 that are to be sent to the modules 180 during operation of the request and response sequencing. This may entail the data acquisition application 170 providing or programming specific channel list commands 145 into the channel list 140 in a predetermined order that dictates how to exercise the specific modules 180 during request/response operation of the DAQ-BIOS 120 and 122. In one embodiment of the invention, the channel list 140 represents a circular list of commands 145 that the DAQ-BIOS 120 sequentially cycles through using request and response message sequencing as explained herein in order to provide commands to the modules 180 for acquiring data or controlling the devices 118 connected to those modules 180. Once the modules are initialized and configured and the channel list 140 is established containing the commands to be used to exercise or otherwise operate the modules 180, processing proceeds to step 303 for operation of the channel list commands.

In step 303, the central controller 110 enters operation of a control loop to send the commands 145 in the request messages 190 to the modules 180-1 through 180-N and to obtain response messages 195 containing data output from the modules 180. Processing steps 304 through 310 illustrate details of processing of this operation control loop (i.e., step 303) according to one example operation of embodiments of the invention. In other words, this example operation control loop (i.e., step 303) comprises the operation of the DAQ-BIOS 120 within the central controller 110 in order to exercise the modules 180.

In step 304, the DAQ-BIOS 120 obtains a command 145 from the channel list 140.

Next, in step 305, the DAQ-BIOS 120 inserts the commands 145 into a request message 190 causing a DAQ-BIOS packet to be formed. Details of this packet format will be explained shortly.

Next, in step 306, the DAQ-BIOS determines if the commands 145 obtained from the channel list 140 indicate whether the timing pattern to be used for this command is either a variable timing pattern or a fixed timing pattern. As discussed above, a fixed timing pattern (FIG. 5) operates to send one or more commands 145 to individual modules in separate request messages 190 whereas a variable timing pattern allows a bundled request message 190 (FIG. 6) to be created containing multiple commands 145 for different modules 180. Accordingly, in step 306, in this example embodiment, if the command obtained from the channel list and inserted into the request message 190 (e.g., in steps 304 and 305) indicates that a variable timing pattern is to be used processing proceeds to step 307.

Figure 8:
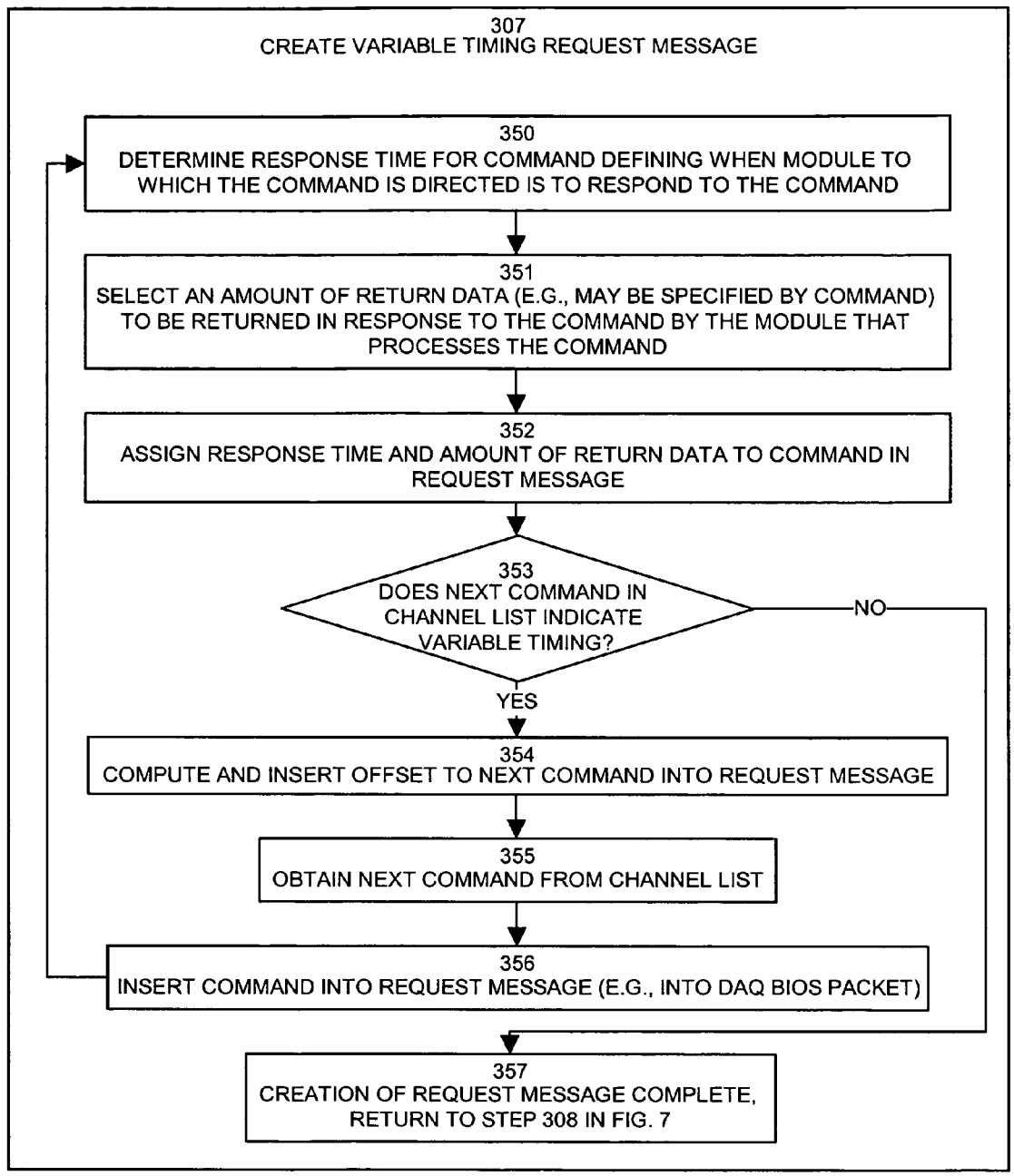
FIG. 8 is a flow chart that illustrates an example of processing steps performed by DAQ-BIOS to create a variable timing request message sent from a central controller to multiple modules according to one embodiment of the invention.

In step 307, when a variable timing pattern is in use, the DAQ-BIOS creates a variable timing request message 190 by proceeding to step 350 at the top of FIG. 8. This processing of FIG. 8 will be discussed shortly.

Returning attention now back to step 306, in the event that the command 145 obtained from the channel list 140 indicates that a fixed timing pattern is to be used for this command, the DAQ-BIOS 120 proceeds to process steps 308 through 310.

In step 308, the DAQ-BIOS 120 transmits the request message 190 containing at least one command 145 onto the network 115 of modules 180. Depending upon the timing pattern in use, the request message 190 will either be sent using a fixed timing pattern request message containing the address of the single module 180 on the network 115 or, in an alternative embodiment of the invention, the request message will be a bundled request message 190 containing multiple commands for multiple modules 180 and may include a multicast or broadcast address which each module 180 can use or respond to in order to receive the request message 190.

Next, in step 309, after transmission of the request message 190 onto the network 115, the DAQ-BIOS 120 saves any required request message state. In this example embodiment of the invention, the DAQ-BIOS 120 can save, for example, the number of modules that are expected to respond to this particular request message 190 as well as the particular response times at which those modules 180 are expected to respond and a can save a stated amount of data which is required or expected to be received from each module 180. In this manner, using the request message state, the DAQ-BIOS 120 can determine if response messages 195 that are later received in response to transmission of the request message 190 are accurate (i.e., are received from the appropriate modules at the appropriate times and contain an appropriate amount of response data).

Next, in step 310, the DAQ-BIOS 120 receives a response message 195 from at least one module 180 on the network 115. Processing of response messages 195 by the DAQ-BIOS 120 is illustrated in detail beginning at step 380 in FIG. 9, which will be explained shortly. After receipt of a response message from at least one module 180, processing returns to step 304 in the operation control loop in order to send another command 145 (or group of commands in the case of variable timing) to one or more modules on the network 115. In this manner, the DAQ-BIOS processing repeats itself and successive commands 145 contained within the channel list 140 are transmitted to the modules 180 for the central controller 110. This processing can continue for a full sequence of commands 145 within the channel list 140 and upon reaching the last command of the channel list 140, the DAQ-BIOS 120 can again repeat the processing commands 145 beginning at the top of the channel list 140. This processing of channel list commands by modules can continue until the data acquisition application 170 indicates to the DAQ-BIOS 120 that processing is now complete.

FIG. 8 is a flow chart showing (in steps 350 through 357) the details of processing step 307 from FIG. 7 as performed by the DAQ-BIOS 120 within the central controller 110 to create a variable timing request message 195 containing one or more commands 145 for multiple modules 180 according to one example embodiment of the invention.

In step 350, the DAQ-BIOS 120 determines a response time for the command 145 obtained from the channel list 140 (in step 304 in FIG. 7) that defines when the module 180 to which this command is directed is to respond to this command 145. In other words, in step 350, the DAQ-BIOS 120 identifies the time within the variable timing pattern at which the particular module 180 to which this command is directed is to respond after processing the command 145. In a preferred embodiment of the invention, the response times for each module 180-1 through 180-N may each be different when a bundle variable timing pattern request message 190 is used to transmit a group of commands to each of the modules on the network 115. In this manner, each module 180 response 195-1, 195-2 . . . 195-X (where X is the number of modules for which commands are contained in the bundled request message 190) will provided at a different time thus avoiding collisions on the network 115.

Next, in step 351, the DAQ-BIOS 120 selects an amount of return data to be returned in response to the command 145 by the modules 180 that process that command 145. In other words, in step 351, the DAQ-BIOS determines how much data should be returned in response to processing this particular command by a particular module. The amount of return data selected in step 351 determine, to some extent, the next response time of another module to which a variable timing request message (i.e., a bundle request message) 192 is sent. As an example, if the response time for a particular module 180-1 is time P, and 1 kilobyte of data is to be returned from this module 180-1, then the response time for a next responding module 180-2 in the variable timing sequence will be time P plus the amount of time required for the module 180-1 to respond with 1 kilobyte of data on the network 115. Accordingly, the DAQ-BIOS 120 can keep an accounting of response times and amounts of data that are to be requested from each module 180 for use in determining subsequent response times for other modules from which data is requested by the same bundled request message 190 used in the variable timing pattern.

In step 352, the DAQ-BIOS 120 assigns the response time and the amount of return data to the command within the request message 190 (i.e., which is a bundled request message 190 for the variable timing pattern).

Next, in step 353, the DAQ-BIOS 120 examines the next command 145 in the command list 140 to determine if the next command in the channel list indicates a variable or fixed timing pattern. Each command 145 in the channel list 140 can indicate whether it is to be part of a variable or fixed timing pattern when sent within a request message 190 to the modules 180. Accordingly, in a preferred arrangement of the channel list 140, those commands that are to be collectively sent to multiple modules 180 at the same time should be sequenced together in a serial or sequential manner within the channel list 140 such that they are bundled within a single variable timing request message 190. Accordingly, in step 353, if the next command in the channel list indicates a fixed timing pattern, processing proceeds to step 357 at which point the creation of the bundled request message 190 is complete and processing returns to step 308 in FIG. 7. Alternatively, in step 353 if the next command in the channel list indicates that it is associated with the variable timing pattern, than this next command 145 in the channel list 140 is also to be included within the bundled request message 190 which has already been created by at least one pass of the processing in FIG. 8. Accordingly, processing proceeds to step 354.

In step 354, the DAQ-BIOS 120 computes and inserts an "offset" to the next command 145 into the request message 190 being created by this processing in FIG. 8. In particular, since a single bundled request message 190 is capable of containing multiple commands for multiple modules 180, the command(s) to be executed that are applicable to one module are delineated or separated from the command or commands applicable to another module within the request message 190. Accordingly, since the bundled request message 190 is a collection of commands applicable to different modules, the command set containing one or more commands for one module may be displaced by the offset that DAQ-BIOS 120 computes in step 354 into the request message 190. An example data structure for a variable timing pattern bundled request message 195 is shown in the attached Appendix. As will be explained shortly with respect to module processing of a request message in FIG. 10, a module 180 that receives a request message containing commands for many modules can use this offset to traverse or parse the request message 190 containing many commands 145 for many modules to locate the command set within that request message which is applicable to that particular module.

Next, in step 355, the DAQ-BIOS 120 obtains the next command 145 from the channel list 140. The command that the DAQ-BIOS 120 obtains in step 355 is the command which step 353 identified as being part of the variable timing pattern and thus should be included within this bundled request message 190 being formulated by the processing illustrated in FIG. 8.

Next, in step 356 the DAQ-BIOS 120 inserts the command 145 (obtained in step 355) into the bundled request message 190. In other words, in step 356, the DAQ-BIOS 120 inserts the command into a DAQ-BIOS packet being formed by the processing shown in FIG. 8. Thereafter, processing proceeds back to step 350 to repeat the aforementioned processing for this command just inserted into the request message.

In this manner, according to the processing illustrated in the example embodiment shown in FIG. 8, the DAQ-BIOS 120 is able to produce the request message 190 that contains multiple bundled commands for multiple modules 180. After the processing of FIG. 8 is complete, step 357 causes the processing to return to FIG. 7 to perform steps 308, 309 and 310 in order to transmit the bundled request message 190 to the modules 180-1 through 180-X and to receive a response for each module as explained herein.

Figure 9:
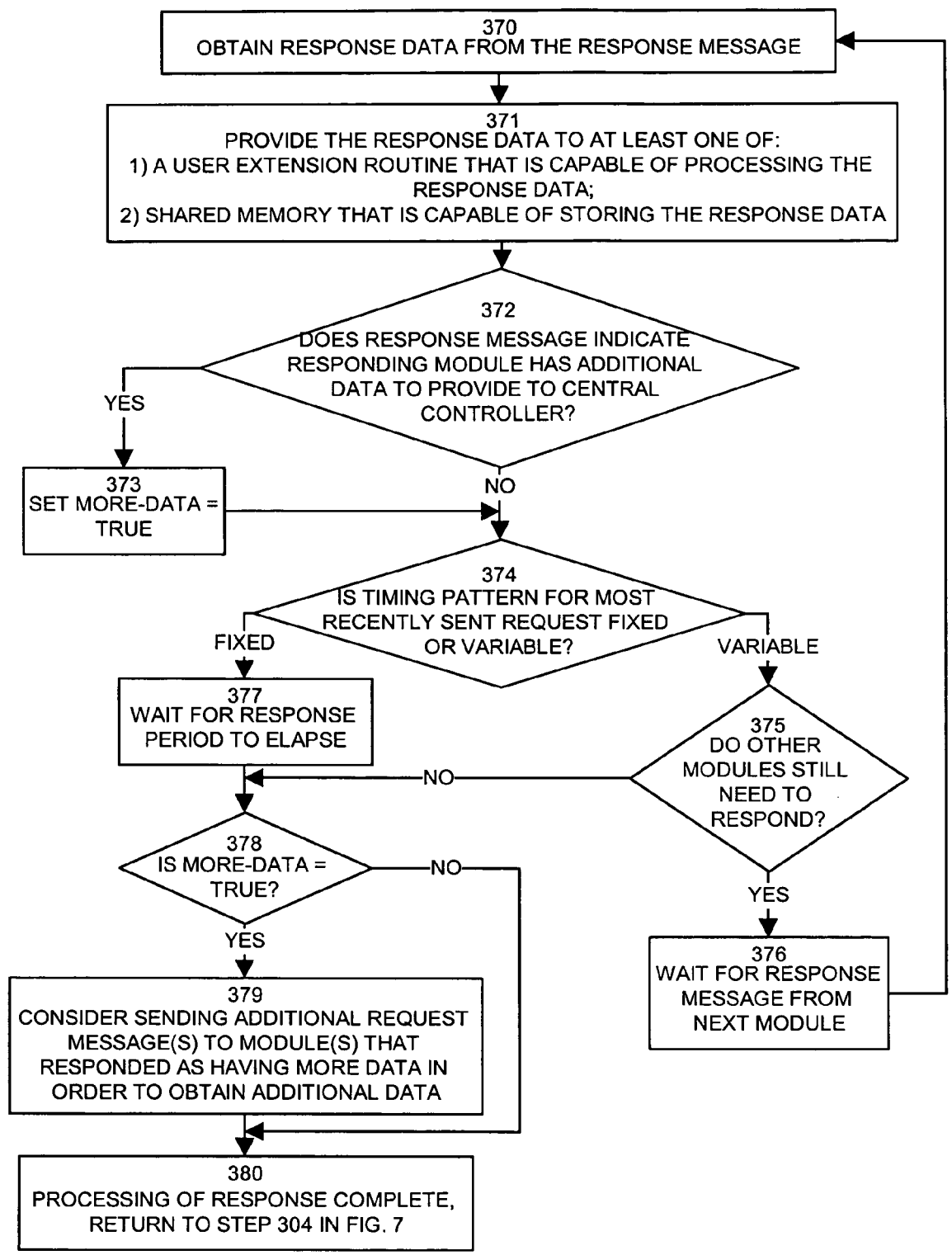
FIG. 9 is a flow chart that illustrates an example of processing performed by DAQ-BIOS within a central controller to process response messages received from a module according to one example embodiment of the invention.

FIG. 9 is a flow chart of processing steps which describe processing operations performed by the DAQ-BIOS 120 operating within the central controller 110 in order to obtain and process response data contained within the response message 195 received from a module 180 that has responded to a request message 190 (either bundled or for fixed timing pattern). Generally, processing of response messages for both the fixed and variable timing patterns is quite similar in this embodiment of the invention. However, differences do exist since the DAQ-BIOS 120 operating a variable timing pattern will receive multiple responses for multiple modules in response to transmitting a single request message whereas in the fixed timing pattern, once a response is received from a single module, processing can return to the end of step 309 FIG. 7 in order to continue processing commands 145 in the channel list (i.e., by returning to step 304 FIG. 7).

In FIG. 9, in step 370, the DAQ-BIOS 120 obtains response data from within the response message 195.

In step 371, the DAQ-BIOS 120 provides the response data to either the user extension routine 150 (FIG. 1) that is capable of processing response data, or provides the response data to shared memory 160 (also shown in FIG. 1). In this manner, immediately (i.e., as soon as possible) upon receipt of a response message 195, the DAQ-BIOS 120 extracts the response data and provides it to its proper destination for the fastest processing time possible.

According to one embodiment of the invention, it may be possible that the amount of response data that a request message 190 indicates that a module 180 can supply back to the central controller 110 within a response message 195 is less than the actual amount of data that the module has acquired from the device 118. In other words, the module 180 may have more data waiting to be transported back to the central controller 110 than what is capable (e.g., due to packet size limitations) in a single response message 195. Accordingly, in step 372, the DAQ-BIOS 120 operating in the central controller 110 determines if the response message 195 indicates that the responding module 180 has additional data to provide to the central controller 110. If the response message 195 indicates that additional data is available to the module, processing proceeds to step 373.

In step 373, the DAQ-BIOS 120 sets a "MORE-DATA" flag value to "TRUE" and processing proceeds to step 374. The MORE-DATA flag indicates that a module 180 has additional data to be returned to the central controller.

In step 372, if the response message does not indicate that additional data is available for the module or after processing steps 373, in either event processing proceeds to step 374.

In step 374, the DAQ-BIOS 120 determines if the timing pattern for the most recently sent request message 190 is a fixed or variable timing pattern. In other words, in step 374, if the most recently transmitted request message 190 is transmitted to a module according to a fixed timing pattern, processing proceeds to step 377. Alternatively, if the most recently transmitted request message 190 included commands for multiple modules and thus was transmitted according to a variable timing pattern, processing proceeds to step 375.

In step 375, the DAQ-BIOS 120 determines if other modules still need to respond to the request message 190. In other words, the DAQ-BIOS in step 375 determines if it has received responses 195 from all modules 180 to which commands were contained were directed within the most recently transmitted request message 190. If all modules have responded, processing proceeds to step 376.

In step 376, the DAQ-BIOS 120 has completed processing for the most recently received response message 195 and waits for the next response message 195-X from the next module 180-X. Upon receipt of the next response message 195, processing returns to step 370 at the top of FIG. 9 in order to process this message as explained herein.

Returning attention now to step 375, the if no other modules need to respond to the most recently transmitted request message 190, processing proceeds to step 378 for completion of response processing according to steps 378 through 380.

Accordingly, according to the processing path shown in FIG. 9 from step 374 to 375 and then to 376, the DAQ-BIOS receives a response message 195 from a module in determines that other modules have still yet to respond during the variable timing response sequence and DOS processing returns to step 370 to obtain response data from the next response message.

Returning attention now to step 374, if the timing pattern is a fixed timing pattern, processing proceeds to step 377 and then no more response messages 195 are expected from any other modules 180. At this point, DAQ-BIOS 120 waits for the response period or time allocated to the module to elapse or complete. In other words, if a response time T is allocated in a fixed timing pattern to completely receive a response message 195 from a particular module and that response message for that module is received in a time shorter than time T, than in step 377, the DAQ-BIOS 120 and central controller can wait for the time T to completely elapse before sending the next request message 190-X to the next module. Note that in step 377, in a fixed timing pattern, it is optional and in an alternative embodiment of the invention, as soon as a response 195 is completely received from a module in a fixed timing pattern, processing can proceed from step 374 to step 378 to send the next request message 190.

In step 378, the DAQ-BIOS 120 determines if the MORE-DATA flag was set to true in step 373. If so, processing can proceed to step 379. Recall that the MORE DATA flag indicates that a particular module had provided the response message 195 to the DAQ-BIOS 120 that indicated that module 180 has additional data to be returned to the central controller 110. In such cases, processing proceeds to step 379.

In step 379, the central controller under the control of the DAQ-BIOS 120 can consider sending additional request messages 190 to any modules 180 that responded as having more or additional data available for receipt by the central controller in order to obtain additional data from these modules. This can be accomplished, for example, by sending separate request messages to those modules having extra data after completion of a response frame as illustrated in either the fixed or variable timing pattern in FIGS. 5 and 6. That is, according to this embodiment of the invention, processing can briefly deviate from command list processing in order to send additional request messages 190 to those modules 180 that have responded during a particular response frame of a fixed or variable timing sequence and which indicated to the central controller 110 that they have additional data to provide. Accordingly, during receipt of response message in a response frame for one sequence of modules 180, the DAQ-BIOS 120 can "remember" which modules indicated they have additional data to be transmitted back to the central controller. After completion of the response frame, this embodiment of the invention can then go back and send additional request messages 190 to only those modules that indicated they have additional data to be forwarded to central controller. After receiving response messages 195 to these extra request messages 190, routine DAQ-BIOS processing can be returned in order to perform another response frame according to the fixed or variable timing diagram as dictated by the arrangement of commands 145 within the channel is 140.

After processing step 379, or any alternative, if the processing in step 378 determined that no modules have additional data to be transmitted essential controller, processing proceeds to step 380 to return to step 304 in FIG. 7. In this manner, processing returns to again performed commands within the channel is 140.

Using the aforementioned processing operations of the DAQ-BIOS 120 within a central controller 110, embodiments of the invention are capable of controlling data acquisition in an extremely precise and high-performance manner. Through the selection of different timing patterns for use in sending and receiving request and response messages between the central controller 110 and the modules 180, embodiments of the invention allow a user to set up the channel list 140 which can contain commands 145 to query certain modules using, for example, a fixed timing pattern while other modules are queried for data or are controlled using variable timing patterns.

Figure 10:
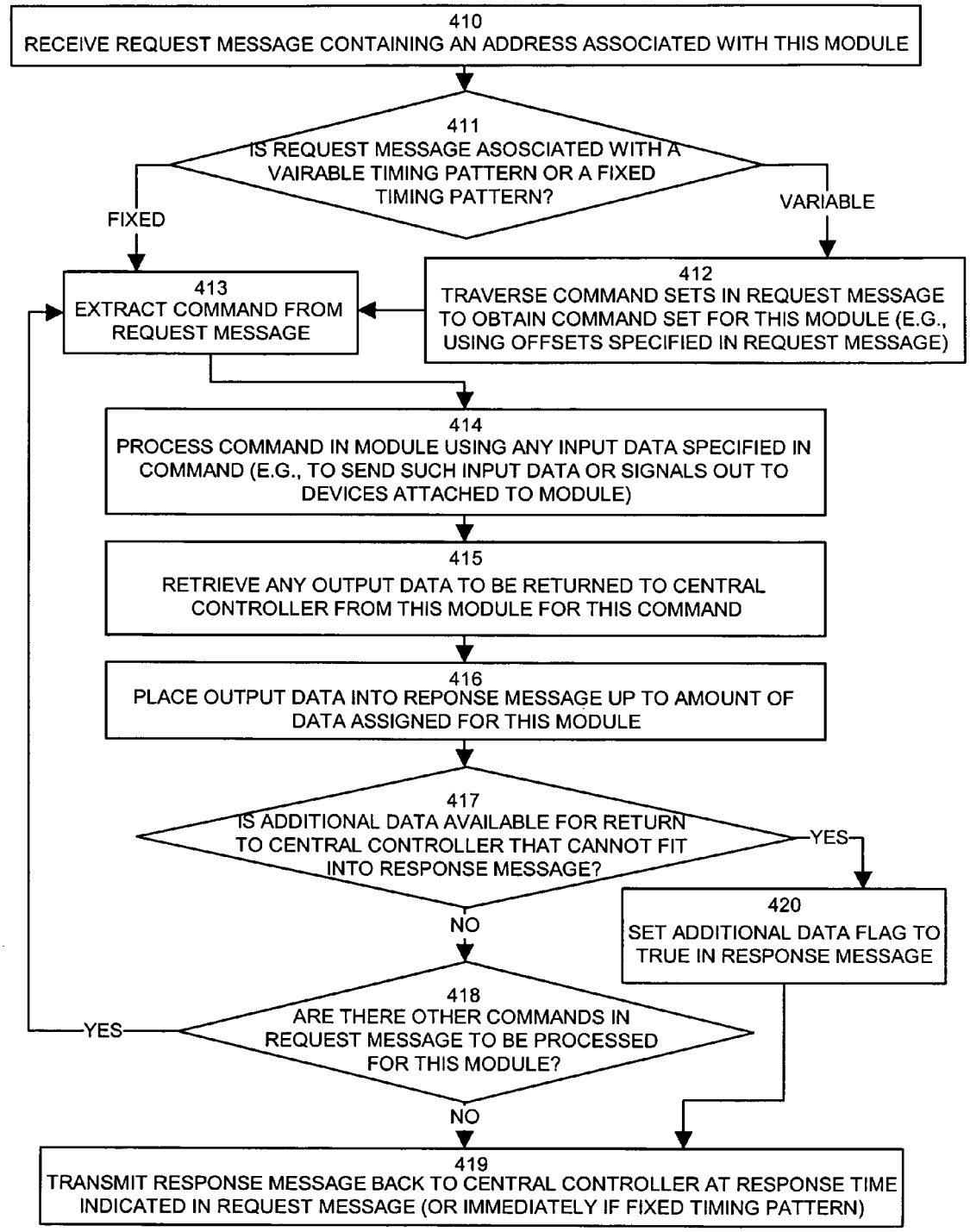
FIG. 10 is a flow chart that illustrates an example of processing performed by DAQ-BIOS within a module to process a request message and produce a response message according to one embodiment of the invention.

FIG. 10 illustrates an example of processing steps performed by the DAQ-BIOS 122 operating within the modules 180 according to one example embodiment of the invention in order to receive and process the request message 190 and to produce a corresponding response message 195.

In step 410, the DAQ-BIOS 122 operating within a module 180 receives a request message 190 containing at least one command and that has an address associated with this module 180 (e.g., either that modules unique address or a multicast or broadcast address). This processing can entail a data link layer operating within the module 180 detecting the DAQ-BIOS packet transmitted onto the network 115 containing a MAC layer Ethernet address to which this module 180 has been configured to respond. If the request message 190 was transmitted according to the fixed timing pattern as previously explained, the request message has an Ethernet address equivalent to the unique Ethernet address of this particular module receiving request message. Alternatively, modules can also be configured to recognize Ethernet addresses which are referred to herein as multicast or broadcast addresses which allow multiple modules 180 to each detect a packet on the network 115. In this manner, the central controller 110 can transmit a variable timing packet containing a bundled request message 190 which is destined for multiple modules using a single Ethernet destination MAC layer address which each module that is configured to recognize that address will receive and process.

Next, in step 411, the DAQ-BIOS 122 determines if the request messages is associated with a variable timing pattern or a fixed timing pattern. If the request message 190 is a bundled request message and is received according to a variable timing pattern, processing proceeds to step 412.

In step 412, the DAQ-BIOS 122 traverses the command sets contained within the bundled request message 190 in order to obtain the command sets associated with this module 180. The particular command set associated with this module within the bundled request message 190 can be located using the offset information computed in step 354 in FIG. 8 as explained above. After obtaining the command or commands within the request message in step 412, processing proceeds to step 413.

Returning attention to step 411, if the DAQ-BIOS 122 uses a fixed timing pattern to receive the request message 190 processing proceeds to step 413.

In step 413, the DAQ-BIOS extracts the command 145 from the request message 190 to be performed within this module 180.

In step 414, the DAQ-BIOS 122 processes the command 145 within the modules 180 using any input data specified in the command. As an example, the command may include a single level or other information which the DAQ-BIOS 122 can send his input data were signals from the module 180 to one or more devices 118 coupled to the module 180.

In step 415, the DAQ-BIOS 122 retrieves any output data to be returned to the central controller 110 from this module 180 in response to processing this command 145.

In step 416, the DAQ-BIOS places the output data into a response message 195 up to an amount of data assigned for this module 180. As explained above with respect to step 352 in FIG. 8, a request message 190 can indicate an amount of response data that the module 180 should return in response to the request message 190. This information is used in step 416 to place the correct amount of output data or response data into the response message 195 that will be transmitted by the DAQ-BIOS 122 in this module 180 back to the central controller 110.

Next, in step 417, the DAQ-BIOS 122 operating within the modules 180 determines if additional data is available for return to the central controller 110 from the module that can fit into the response message 195. In other words, in step 417, the DAQ-BIOS 122 determines if there is more output data available in the module 180 than what was requested by the amount of return data specified in the request message 190 from essential controller 110. If additional data is available for return to essential controller 110 from this module 180 (i.e., more data can what can fit into a single response message 195), processing proceeds to step 420.

In step 420, the DAQ-BIOS 122 sets an "ADDITIONAL DATA FLAG" to "TRUE" in the response message 195. This flag can indicate to the DAQ-BIOS 120 operating in the central controller 110 that this particular module 180 has additional data available for retrieval should the central controller 110 opt to obtain such data. As discussed above with respect to step 372 in FIG. 9, the central controller can detect this ADDITIONAL DATA FLAG in order to consider, in step 379, sending additional request messages 190 to the module 180. If processing performs step 420, then it can be assumed that the response message 195 is already completely filled to capacity with response data and thus processing proceeds to step 419.

In step 419, the DAQ-BIOS 122 operating in the module 180 transmits the response message 195 back to the central controller 110 at a response time indicated in the request message 190, or, in the case of using a fixed timing pattern, the DAQ-BIOS 122 can immediately transmit the response message 195 back to the central controller 110. Accordingly, in step 419, for a variable timing pattern, the DAQ-BIOS 122 waits until its proper response time associated with the module in which this DAQ-BIOS 122 is operating and then transmits the response message back to the central controller.

Returning attention now back to step 417, if additional data is not available for return to the central controller 110, processing proceeds to step 418.

In step 418, the DAQ-BIOS 122 operating in the module 180 determines if there are other commands can request message 190 to be processed for this module 180. If so, processing proceeds back to step 413 in order to extract the next command from the request message 195 that is applicable to this module 180. In this manner, a single request message 195 can contain multiple commands 145 pricing the module 180 in either a fixed for a variable timing patterns. If the DAQ-BIOS 122 determines that no other commands are present in the request message 195 for this module 180, processing proceeds to step 419 that, as explained above, transmits the response message 195 back to the central controller 110.

In this manner, the DAQ-BIOS 122 operating within each module 180 can process request messages 190 in order to input any data to the devices 118 coupled to the module 180 and also to output any recorded signaling information measured or otherwise obtain from the devices 118 and one or more response message is 195 back to DAQ-BIOS 120 operating within the central controller 110.

Those skilled in the art will understand that there can be many variations made to the embodiments explained above while still achieving the same objective of those embodiments and the invention in general. For example, rearrangement of certain processing steps in the flow charts explained above can be performed by those skilled in the art while still accomplishing the overall functionality of embodiments of the invention. Such variations are intended to be covered by the scope of this invention. As such, the foregoing description of embodiments of the invention is not intended to be limiting. Rather, any limitations to the invention are presented in the following claims.

APPENDIX

This Appendix provides an example of an Application Programming Interface (API) for a data acquisition and control system using DAQ-BIOS implemented according to one example embodiment of the invention. It is to be understood that this is an example only and provides a sample command interface that a programmer can use to configure and operate the channel list and DAQ-BIOS. It also provides an example of some details of processing performed by this example implementation of DAQ-BIOS. It is not intended to be limiting of embodiments of the invention.

Example DAQ-BIOS Application Programming Interface

IOM = Module
CC = Central Controller

Addressing:
We use 32-bit address to address devices in IOM. The format is
<controller.port.iom.device>. Each value is signed byte.
controller = {1..16}
port = {1..4}
iom = {1..64}
device = {1..8}
Zero is used if one of the nibbles is not used or to specify that function scope applies to all devices.

Initialization functions

**int DqOpenDriver(int* controllers_installed);**
Function is to be called from host computer to open PDNA driver. Function
Input: none
Output: number of central controllers installed
Return: handle to the driver (dhandle) or negative error code
Note: for controller API use standard Linux *open()* call

**int DqLocateIOM(u32 addr, MAC* mac);**
This function locates IOM return its address for future use. It can be called if one knows what module should be open and its MAC address.
Input: MAC address of the IOM. You can also specify controller and port in the addr parameter to avoid scanning all available port
Return: d_addr – address of the module. Negative value is an error code.

*int DqLocateIOMbyName(char\* iom_name);*
This function is similar to *int DqOpenIOM()* however:
Input: char iom_name[32] – mnemonic name of the device
Return: d_addr – address of the module. Negative value is an error code.
Notes:
1. Network scan shall be completed at the time of function call.
2. This function scans device entry table to match the name. It opens first device with matching name (case-insensitive). Every IOM should have its own name.

*int DqLocateIOMbyIP(u32 IP);*
This function is similar to *int DqOpenIOM()* however:
Input: IP of the device requested
Return: d_addr – address of the module. Negative value is an error code.

Information functions

*int DqGetNbOfControllers();*
Input: none
Return: number of controllers installed in the host system

*int DqGetNbOfPorts (int d_addr);*
Input: Address including controller number
Return: number of ports on this controller

*int _DqScanPort(int d_addr, bool FindFirst, IOMINFO\* piominfo)*
Function returns information about devices connected to the port. Set bool FindFirst to TRUE is it's a first request to this function and FALSE for the following.
Input: address to specify controller and port (leave the rest of the address blank), FindFirst, pointer to IOMINFO structure allocated by calling process. Function fills this structure
Return: positive address or negative -ERRNOMORE if there is no more devices to return information from

```
typedef struct {
      char   name[32];      // device name, ASCIIZ
      u32    model;         // device model
      u32    ipaddr;        // ip address
      u8     mac[6];        // MAC address
      u32    sernum;        // serial number
      int    caldate;       // calibration date/error
      u16    slice[8];      // device (slice) information
} IOMINFO, * pIOMINFO;
```

Device name is the key for device database. One can replace a module with different one. The name is the unique identifier of the IOM position in the system. For example, "Flow meter 2". Name is not case-sensitive.

Calibration date/error: 1 = Jan, 1, 2001, negative is error

IP address can be set to 0xffffffff if device was never programmed.

MAC address is always set and always unique.

slice[10] contains information about device models installed. A device model identifies number and type of IOs on the slice.

Function execution starts with sending broadcast DQCMD_RST requests. Each IOM replies upon receiving Dq packet with echo packet. This function is performed three times in a row in case one of the devices lost the packet or collision occurred. Then function sends DQCMD_RDCFG to all devices found in the reset phase. Also it sends DQCMD_RDNAME to receive mnemonic name of the IOM.

IOM returns following 32-bytes structure upon DQCMD_RDCFG request:

```
typedef struct {
        u32     model;          // device model
        u32     ipaddr;         // ip address
        u32     sernum;         // serial number
        int     caldate;        // calibration date/error
        u16     slice[8];       // device (slice) information
} DQRDCFG, * pDQRDCFG;
```

*int DqScanForNewDevices(int d_addr, bool FindFirst, IOMINFO* piominfo)*

This function is similar to *DqScanPort()*

However this function doesn't cause re-initialization of all devices but rather issues a DQCMD_ECHOPNP command. Upon this command only unutilized devices are prompt to reply. Because of this function shouldn't disrupt device must delay with the answer for arbitrary amount of time (up to remaining time of the current frame) and then reply. If collision is detected IOM should not try to retransmit reply.
Normal behavior of PnP function is to call DqScanPort() once a second to find out whether additional devices appears on the port.
After device is found function issues DQCMD_RST to reset device found and then dispatch DQCMD_RDCFG and DQCMD_RDNAME calls.

*int DqString2Addr(char* c_addr);*
Converts string representation of address into integer.

Return: address or negative on error

*int DqAddr2String(int d_addr, char* c_addr);*
Converts binary address into string (asciiz) representation
Return: address or negative on error

Configuration functions

*int DqSetTimeBase(int d_addr, int us, bool master);*
Function selects timebase for controller
Input: controller address, timebase in microseconds. Set bool master = TRUE if controller is the master in the system, set it to FALSE if controller is slave device.

*int DqSetClockLine(int d_addr, int input_line, int output_line);*
Function selects what line on PXI bus to use as an input and output clock lines
Input: controller address, PXI line for input clock, PXI line for output clock

*int DqSetTrigLine(int d_addr, int input_line, int output_line);*
Function selects what line on PXI bus to use as an trigger input and trigger output lines
Input: controller address, PXI line for input trigger, PXI line for output trigger

*int DqSetDirection(int d_addr, int channel, int direction );*
Function sets direction of channel (DIO slices)
Input: controller address, channel and direction (DIO)

*int DqSetConfig(int d_addr, int device, u32 configuration );*
Function set configuration settings specific to the selected device

*int DqSetParams(int d_addr, int prop ,int index, int value);*
Function set configuration parameters

Parameters:
DaqBIOS defines following properties:
dqprIPAddr – IP address
dqprName – device name
dqprBaud – baud rate
dqprComPort – serial port or IrDA

*int DqSaveParams(int d_addr);*

Saves parameters for the device

*int DqRestoreParams(int d_addr);*

Restores previously saved (or default) parameters for the device

Data mapping functions

*DMAP\* DqDmapCreate(int d_addr);*
Function allocates data map for the specified scope. Data map can be allocated for the whole host (d_addr = 0.0.0.0), controller (d_addr = c.0.0.0), port (d_addr = c.p.0.0), IOM (d_addr = c.p.i.0) or particular device (d_addr = c.p.i.d). Note that excessive use of small data maps may take longer processing time. It is legal to overlap device maps because all values are ORed.
Return: data mapping table pointer or NULL on error

*int DqDmapDestroy(DMAP\* data_map);*
Function destroys data mapping created by int DqCreateDataMap(int chandle);
Input: pointer to data mapping table
Return: 0 – OK or negative return code

*int DqDmapClear(DMAP\* data_map);*
Function clears data mapping table entries
Input: pointer to data mapping table
Return: 0 – OK or negative return code

*int DqDmapAddDevice(DMAP\* data_map, int d_addr, CLDEV\* channel_list);*
Function selects channel, configuration and direction of the device attached to the IOM.
Input: full device address, channel list
Function:
1. Adds an entry into data mapping table and allocates memory to store in/output data from/to this device
2. Performs configuration of the selected device

```
typedef struct {
      u16 channel;      // channel number
      u16 config;       // configuration including direction bit
} CLDEV, *pCLDEV;
```

There are two ways to access data.
One way is to parse DMAP data_map table and retrieve data directly.
Second way is to use following functions:

*int DqDmapSetVal(DMAP\* data_map, int d_addr, int channel, u16 value);*
Function sets value for the selected channel. Please note that this value won't be update until next frame
Return: positive number microseconds or negative error code

*int DqDmapGetVal(DMAP\* data_map, int d_addr, int channel, u16\* value);*

Function gets value from the selected channel. Please note that this value is updated every frame

*int DqDmapSetValAll(DMAP\* data_map, int d_addr, u16 value);*
Function sets value for all channels of the specified device. Please note that this value won't be update until next frame

*int DqDmapGetValAll(DMAP\* data_map , int d_addr, u16\* value);*
Function gets value from all channels of the specified device. Please note that this value is updated every frame

Event functions

Event functions allow to set callback function to be called on selected events. It is possible to have single event function for each type of event or to split processing of different type of events into separate functions.

*int DqAddEvent(DQEVENT\* dqevet);*

This function adds event to the event list.

There are two ways of receiving event – synchronous and asynchronous. You can specify callback function for synchronous event notification or event handler for asynchronous notification.

Input: event definition structure
```
typedef struct
{
    int     d_addr;              // device address
    int     channel;             // channel
    u32     type;                // event type
    u16     level;               // event level or bit mask
    u16     window;              // hyst. window or edge select
    void    (*func)(int, u16);// callback function or Null
    u32     event;               // event handler or null
} DQEVANT, * pDQEVENT;
```

Return: positive event number (that will be passed to callback function along with the data) or negative error code.

*int DqWaitForEvents(int ncount, int\* events, bool bWaitAll, int timeout_ms);*

This function is a variant of Win32 WaitForMultipleObjects. It purpose to provide the same interface for the event handling under Linux, Windows and QNX host environments.

The *DqWaitForEvents* function returns when one of the following occurs:

- Either any one or all of the specified objects are in the signaled state.

- The time-out interval elapses.

Parameters:

*ncount*
> Specifies the number of object handles in the array pointed to by *lpHandles*. The maximum number of object handles is MAXIMUM_WAIT_OBJECTS.

*events*
> Pointer to an array of object handles. The array can contain handles to objects of different types. It may not contain the multiple copies of the same handle.

*bWaitAll*
> Specifies the wait type. If TRUE, the function returns when the state of all objects in the *events* array is signaled. If FALSE, the function returns when the state of any one of the objects is set to signaled. In the latter case, the return value indicates the object whose state caused the function to return.

*timeout_ms*
Specifies the time-out interval, in milliseconds. The function returns if the interval elapses, even if the conditions specified by the *bWaitAll* parameter are not met. If *timeout_ms* is zero, the function tests the states of the specified objects and returns immediately. If *timeout_ms* is INFINITE, the function's time-out interval never elapses.

Return:

If the function succeeds, the return value indicates the event that caused the function to return. This value can be one of the following.

WAIT_TIMEOUT – the time-out interval elapsed and the conditions specified by the *bWaitAll* parameter are not satisfied.

WAIT_OBJECT_0 to (WAIT_OBJECT_0 + *nCount* – 1) - If *bWaitAll* is TRUE, the return value indicates that the state of all specified objects is signaled. If *bWaitAll* is FALSE, the return value minus WAIT_OBJECT_0 indicates the *events* array index of the object that satisfied the wait. If more than one object became signaled during the call, this is the array index of the signaled object with the smallest index value of all the signaled objects.

If the function fails, the return value is WAIT_FAILED.

*int DqClearEvent(int event);*
Clears specific event from event table or all events
Input: event number or 0 to clear all events
Return: 0 – OK or negative return code

Control functions

*int DqStart(int cc_mask, int port_mask);*
Starts operation on selected controller and ports
Input: Controller and port mask. 0xF selects all ports on four ports controller. Note if this function is applied to the controller that is "slave" operation won't start until "master" controller starts. Master and slave controllers are connected via RTSI or PXI interface.
Return: 0 – OK or negative return code

*int DqStop(int cc_mask, int port_mask);*
Stops operation on selected controller and ports
Input: Controller and port mask. 0xF selects all ports on four ports controller. Note if this function is applied to the controller that is "slave" operation won't start until "master" controller starts. Master and slave controllers are connected via RTSI or PXI interface.
Return: 0 – OK or negative return code

Low-level access functions

*int DqReadVal(int d_addr, int channel, u32* value);*
Read value of specified channel. Issues DQCMD_RDCHNL to the device
Return: 0 – OK or negative return code

*int DqWriteVal(int d_addr, int channel, u32* value);*
Write value to the specified channel. Issues DQCMD_WRCHNL to the device
Return: 0 – OK or negative return code

*int DqReadAddr(int d_addr, u32 address, u32 count, u32* value);*
Read <count> values from IOM <address> and store them in <value>
Issues DQCMD_RDVAL or DQCMD_RDVALM to the device
Return: 0 – OK or negative return code

*int DqWriteAddr(int d_addr, u32 address, u32 count, u32* value);*
Write <count> values from <value> to IOM <address> and
Issues DQCMD_WRVAL or DQCMD_WRVALM to the device
Return: 0 – OK or negative return code

*int DqWriteReadAddr(int d_addr, u32 in_ address, u32 in_count, u16* in_values, u32 out_ address, u32 out_count, u16* out_values);*
Write <in_count> values to the <in_address> and read <out_count> values from the <out_address> back. This function allows reading and writing DIOs in one packet.
Issues DQCMD_WRRD command to the IOM
Return: 0 – OK or negative return code

*int DqReset(int d_addr);*
Resets device (c.p.i.d), or IOM (c.p.i.0) specified
Issues DQCMD_RSTALL to the device
Return: 0 – OK or negative return code

*int DqSetCfg(int d_addr, u32 config);*
Sets configuration for device (c.p.i.d), or IOM (c.p.i.0) specified
Issues DQCMD_SETCFG to the device
Return: 0 – OK or negative return code

*int DqGetStatus(int d_addr);*
Returns status word of (c.p.i.d), or IOM (c.p.i.0) specified
Issues DQCMD_RDSTS to the device

Return: 0 – OK or negative return code

*int DqEcho(int d_addr);*
Ping IOM (c.p.i.0) specified
Issues DQCMD_ECHO to the device
Return: 0 – OK or negative return code

*int DqAddCl(int d_addr, u32 channels, u8\* list);*
Add channel into internal channel list of the IOM or device
Issues DQCMD_SETCL to the device. To clear channel list DqReset() should be used
Return: 0 – OK or negative return code

*int DqSetMode(int d_addr, u16 mode);*
Set specified IOM into desired mode – {operation = 0, init = 1, test = 2, shutdown = 3}
Issues DQCMD_SETMD command to the IOM
Return: 0 – OK or negative return code

*int DqReadFIFO(int d_addr, u32\* count, u16\* data);*
Read all data from the device FIFO.
Issues DQCMD_RDFIFO command.
Output: <count> number of bytes transferred
Return: 0 – OK or negative return code

*int DqWriteFIFO(int d_addr, u32\* count, u16\* data);*
Write data to the device FIFO.
Issues DQCMD_WRFIFO command.
Output: <count> number of bytes actually written
Return: 0 – OK or negative return code

*int DqReadAll(int d_addr, u32\* count, u16\* data);*

Read all data from the IOM. Amount and sequence of data points is specified by IOM channel list.
Issues DQCMD_RDALL command.
Output: <count> number of bytes transferred
Return: 0 – OK or negative return code

*int DqWriteAll(int d_addr, u32* count, u16* data);*
Reads all data from the IOM. Amount and sequence of data points is specified by IOM channel list.
Issues DQCMD_WRALL command.
Output: <count> number of bytes actually written
Return: 0 – OK or negative return code

*int DqWriteFlashBuffer(int d_addr, u32 count, u8* data);*
Adds <count> bytes of data to the flash update buffer. This buffer is automatically allocated by the IOM. Function issues DQCMD_WRFLASH to the IOM. IOM takes care of allocating memory to store values. This function is used in pair with DqWriteFlash(); Use DqReset() to clean flash buffer and start over again.
Return: 0 – OK or negative return code

*int DqWriteFlash(int d_addr, int sector, int count);*
Tells IOM to update flash memory from the previously filled flash buffer.
Input: IOM address (c.p.i.0), flash device sector {SA0-SA11}, data size in bytes and data.
Return: 0 – OK or negative return code

*int DqReadCfg(int d_addr, DQRDCFG* devcfg);*
Reads serial number of IOM and types of devices installed.
Input: address, pointer to DQRDCFG structure
Output: DQRDCFG structure
```
typedef struct {
    u32     model;       // device model
    u32     ipaddr;      // ip address
    u32     sernum;      // serial number
    int     caldate;     // calibration date/error
    u16     slice[8];    // device (slice) information
} DQRDCFG, * pDQRDCFG;
```
Return: 0 – OK or negative return code

*int DqStartStopDev(int d_addr, u32 mask);*
Function starts or stops IOM devices by the mask.
Return: 0 – OK or negative return code

*int DqSetClock(int d_addr, u32 clock);*
Set up clock frequency for the device.

Return: 0 – OK or negative return code

*int DqScanNetwork(int d_addr);*
This function is used to scan network and find devices. It fills internal information structures which allows to locate IOM by its mnemomic name or IP
Input: address filled in the part to limit scans scope
Return: zero if success or negative error code

Error functions

*int DqGetLastError(int d_addr);*
Function returns last error function for device specified in <d_addr>

Example of DAQ-BIOS Specifications

In this example, DaqBIOS runs on top of the Ethernet packet layer or on top of TCP/IP packets. On Ethernet packets, it is used on dedicated LANs. Using TCP/IP, DAQ_BIOS can be designed to operate over a WAN or bridged LANs where MAC addresses of IOMs are not accessible.

Hard-real-time response time is possible only when there are no collisions on the network. Thus protocols of this invention are designed to avoid collisions. DaqBIOS provides an iso-synchronous protocol with dedicated master. In this example, a DaqBIOS packet is a fixed size packet with the following structure:

```
#define DQDSZ 36
typedef struct
{
    uint32 dqProlog;        /* const 0xBABAFACA - Dq packet
identification */
    uint16 dqTStamp;        /* 16-bit timestamp */
    uint16 dqCounter;       /* Retry counter + bitfields */
    uint32 dqCommand;       /* DaqBIOS command */
    uint8  dqData[DQDSZ];   /* Payload data */
} DQPKT, * pDQPKT;
```

On a LAN, this DAQ-BIOS packet is wrapped into an Ethernet packet as follows:

```
/* Defined Ethernet Frame Types */
#define FRAME_IP    (0x0800)
#define FRAME_ARP   (0x0806)
#define FRAME_RARP  (0x8035)
#define FRAME_DQ    (0x002E)

/* Maximum and Minimum Ethernet Frame Size (Data Field) */
#define ETH_MAX_SIZE    (1500)
#define ETH_MIN_SIZE    (46)
typedef struct
{
    ETH_ADDR dest;
    ETH_ADDR src;
    ETH_FTYPE type;
    uint8 data[ETH_MAX_SIZE];
} eth_frame_hdr;
```

For Dq packets `ETH_FTYPE type = FRAME_DQ;` In other words Dq packet occupies 46 bytes (which is minimum Ethernet packet size) and the whole size of Eth packet is 64 bytes. It includes destination MAC address (6), source MAC address (6), packet type (2), Dq packet (46) and checksum (4).
MCF5272 has 64 bytes receive and transmit FIFO. Dq packet fits completely in the FIFO and doesn't require additional buffers access to complete transaction. However DaqBIOS packet size is not limited to 46 bytes and depends on hardware implementation.

In this example embodiment, there are two ways of communication with IOM. First way is iso-synchronous access and the second way is broadcast with predefined time slots. Because of realtime nature of Dq we cannot have collisions on the network.

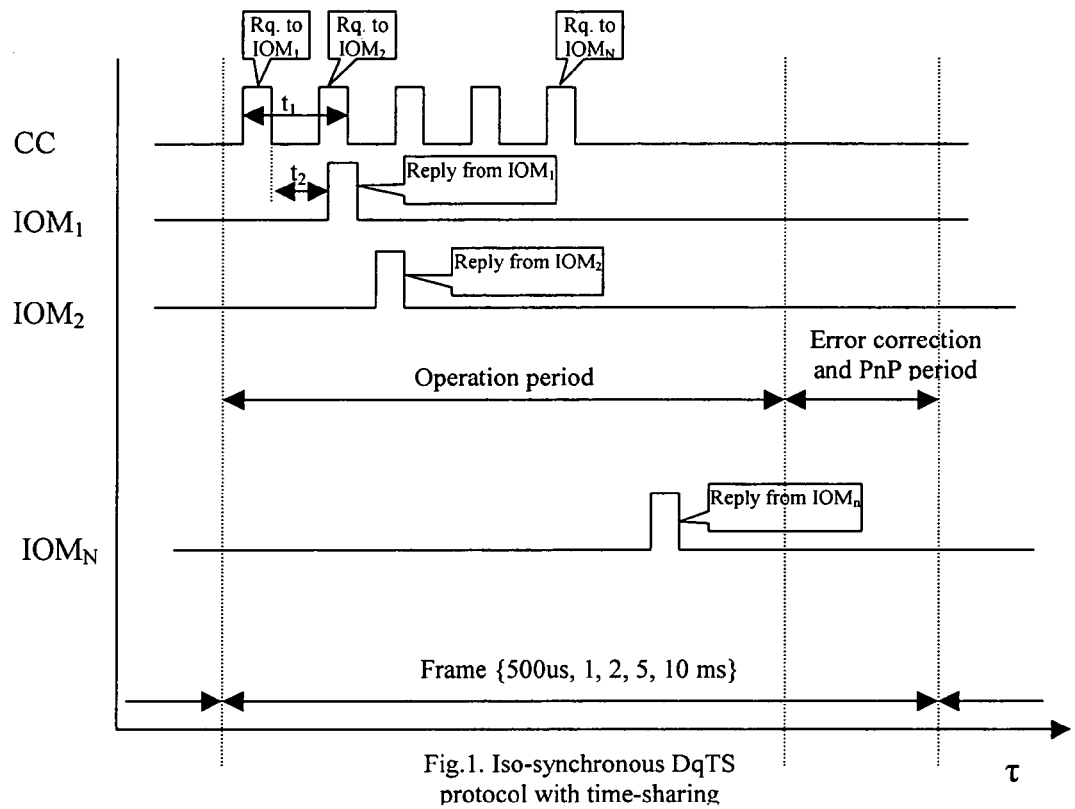
Fig.1. Iso-synchronous DqTS protocol with time-sharing
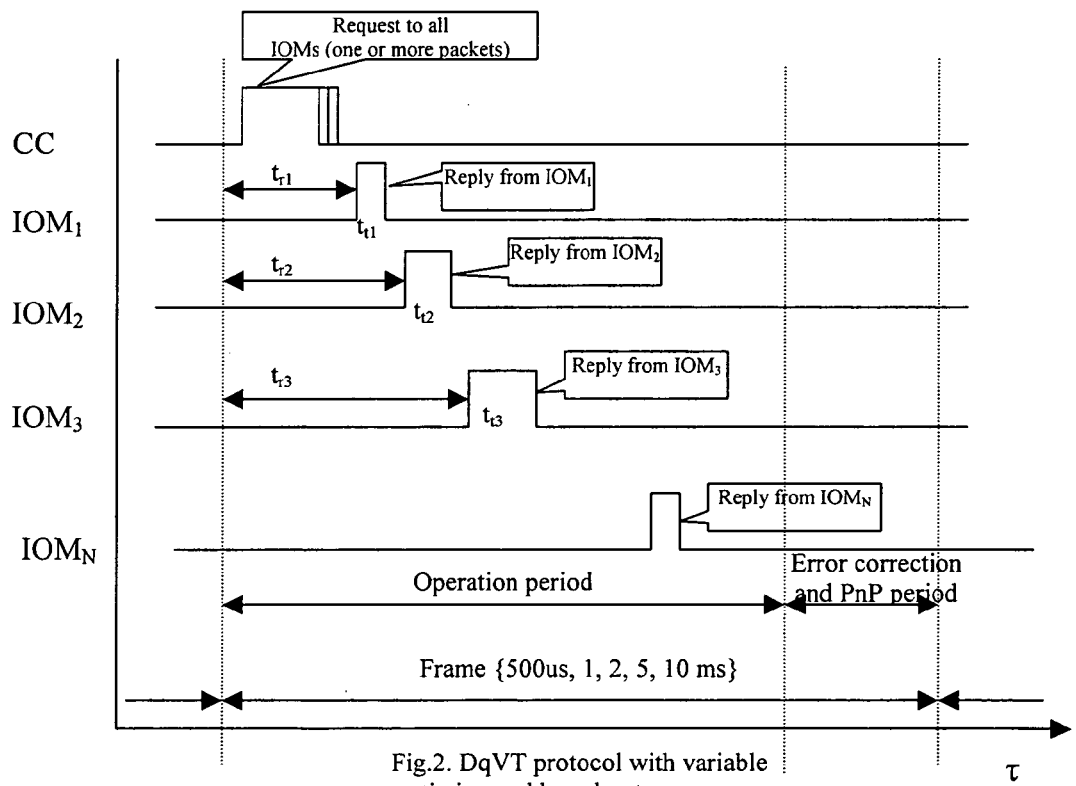
Fig.2. DqVT protocol with variable timing and broadcast message There are two real-time communication protocols available in this example, each as shown in the example graphs above.

The first one (DqTS, shown in top graph) is a time-shared (time division multiplexed) iso-synchronous fixed timing pattern protocol. It shares time between devices during the transaction frame. Central controller sequentially sends Dq requests each $t_1$ microseconds. After predefined time $t_2$ (experimental value is 57us) IOM replies to the CC. By setting time between requests ($t_1$) longer then reply time we guarantee that each IOM will reply ($t_2$) in it's time slice. This ensures that no collisions can happen on the network. Both $t_1$ and $t_2$ can be preset or they can be changed on the fly.

The second timing pattern, DqVT or variable timing (shown in the bottom graph), is designed to overcome limitations of the DqTS protocol. DqVT shares time between devices based on multicast/broadcast request and unicast replies. CC issues multicast message to all IOMs. IOMs are programmed to reply with predefined delay ($t_{ri}$) after receiving a multicast packet with the packet size to fit a transmition window ($t_{ti}$). One advantage of this protocol is flexible bandwidth control. The size of transmition window can be adjusted dynamically. If an IOM reports that it has significant amount data to transmit (from RS-232 port, for example) CC resizes transmition window to accommodate more data. The same thing applies when CC periodically needs to transfer more data to the particular IOM.

The CC can send one or more frames of the flexible size. Obviously DqVT cannot be used on non-dedicated networks.

Protocols ensure that CC will be informed about any event occurring within one response frame period. Thus, this example of DaqBIOS supports an synchronous event notification scheme.

DqTS can be used on dedicated and non-dedicated LANs and WANs. Hard-realtime response can be achieved on dedicated non-bridged LANs. Non-dedicated, bridged LANs, WANs allows soft-realtime response.

Example of How an IOM processes DaqBIOS packets (DqTS)

DqTS over Ethernet frames (MAC addressable)

```
typedef struct
{
    uint32 dqProlog;         /* const 0xBABAFACA - Dq packet
identification */
    uint16 dqTStamp;         /* 16-bit timestamp */
    uint16 dqCounter;        /* Retry counter */
    uint32 dqCommand;        /* DaqBIOS command + bitfields */
    uint8  dqData[DQDSZ];    /* Payload data */
} DQPKT, * pDQPKT;
```

IOM receives request message packet and writes dqTStamp into timer 2. dqTStamp can be used two modes. IOM analyzes dqCommand field for bits set to choose how to use dqTStamp. A first mode is used to calculate time elapsed since command arrived. 16-bit Timer 2 increases value of timestamp each 1us and wraps it around on overflow. When first mode is used IOM replies to the CC after predefined time (stored in firmware parameters). A second mode is a countdown mode. In this mode dqTStamp contains the number of microseconds the IOM shall reply within. In this mode this value is written into Timer 2 and the IOM compares register and zero into count register. Count register increments each 1 us. When Count register value reaches compare register value an interrupt is generated. This interrupt initiates transmission of the response message. In the second mode the system can ensure that time between request and reply packets is enough for a response message.

dqCounter field is used to count packets (similar to TCP protocol). CC starts numbering packets from 1 and up to 32767. Packet with 0 in dqCounter or DQCMD_RST command resets the counter. IOM replies to CC with the same value in this field. If dqCounter in request doesn't match dqCounter in reply packet it means that one or more packets were lost and re-synchronization needs to be performed. Re-synchronization can be performed without leaving operation mode.

A DqTS frame (i.e., a response frame) is divided into operation period and error correction/PnP period. During operation period CC sends requests to IOMs. CC never re-sends the packet if error occurs in operation period. Instead, in this example, the CC waits until error correction period. Then CC re-sends troubled packet to IOM. Only one packet is allowed in this period.

Each second CC sends DQCMD_ECHOPNP in error correction/PnP period. Non-initialized device replies to this packet (IOM firmware sets non-initialized flag after power-on or reset). If responding device encounters error or collision it doesn't try to re-send the packet but rather stays as non-initialized. To clean non-initialized flag IOM firmware should receive unicast packet to its MAC address. This procedure allows CC to discover network configuration on power-up and finds newly attached devices.

Then IOM executes command specified in dqCommand field according with DqData.

When a request message is processed in the IOM and DqData is prepared, the IOM fills the rest of the packet as follows:
1. Switches dest and src fields in Eth header
2. Fill type field in Eth packet
3. Read current Timer2 value and writes it into dqTStamp
4. Write dqCommand field as (dqCommand | 0x1000)
5. Write data count into dqCounter field and set dqCommand bits if any special conditions exists
6. Send the packet back to CC immediately or put in the queue and send it back upon timer interrupt (depends on mode).

Possible errors retuned in dqCommand field:
```
/* errors - or with dqCommand on return */
#define DQERR_EXEC      0x01000000 /* exception on command execution */
#define DQERR_NOMORE    0x02000000 /* no more data is available */
#define DQERR_MOREDATA  0x03000000 /* more data is available */
#define DQERR_NIMP      0x06000000 /* DQ not implemented or unknown command */
#define DQERR_NOOPS     0x07000000 /* DQ not in operation state */
#define DQERR_PARAM     0x08000000 /* Device cannot complete request with specified parameters */

/* network errors */
#define DQERR_RCV       0x10000000 /* packet receive error */
#define DQERR_SND       0x20000000 /* packet send error */
#define DQERR_GENFAIL   0xF0000000 /* general failure */
```

DqTS over TCP/IP protocol
DaqBIOS can be used on networks where nodes cannot be reached by MAC address. This type of networks includes bridged LANs and WANs.
<IN PROCESS>

IOM processing of DaqBIOS packets using the (DqVT)Variable Timing Pattern

A DqVT frame looks like this in this example:

```
typedef struct
{
    uint32 dqProlog;        /* const 0xBABAFACA - Dq packet identification */
    uint16 dqTStamp;        /* 16-bit timestamp */
    uint16 dqCounter;       /* data counter */
    DQVTDTA dqVtData;       /* beginning of data */
} vtDQPKT, * pvtDQPKT;
```

The packet ID is 0xbabafacb for the only or last CC packet and 0xbabafacc for the first packet when more packets are expected. Maximum packet size is 1518 bytes. dqTStamp and dqCounter are used the same way as for DqTS protocol. The last entry into vtDQPKT is DQVTDTA structure. This structure contains information for the first IOM in the frame.

Data in the frame looks as follows:

```
typedef struct
{
    uint8  dest[6];         /* destination MAC */
    uint16 dqNext;          /* next entry or NULL for the last one */
    uint16 dqSize;          /* size of the payload data */
    uint16 dqReplySize;     /* size of the allowed reply packet */
    uint32 dqCommand;       /* DaqBIOS command */
    uint8  dqData;          /* Payload data */
} DQVTDTA, * pDQVTDTA;
```

DQVTDTA includes destination MAC address. dqNext specifies offset of the next DQVTDTA entry relative to the first one (or NULL if it's the last entry). dqSize defines size in bytes of dqData. dqReplySize specifies size of allowed reply packet for the IOM with dest[] MAC address. dqCommand is DaqBIOS command to execute by the IOM with dest[] MAC address.

When an IOM receives one (or more) CC packets it stores it and looks up for its MAC address. If MAC address is found it calculates delay it must wait until it's allowed to reply to the CC. IOM always replies in the sequence of DQVTDTA.

The delay or response time for particular $IOM_N$ is calculated as:

$$\text{Response time} = \text{ByteRate} * \sum_{(i=0..N)}(\text{dqReplySize} + \text{Overhead} + \text{delay} * i)$$

Overhead is a constant and includes length of all fields required to be sent in Eth packet and fixed delay between the packets. ByteRate is the time to send one byte of information over Eth network. Based on this calculation IOM firmware programs timer 2 with $t_{rx}$ and proceeds with command execution. The command should be completed before timer 2 fires interrupt.

IOM firmware understands that it is a DqVT request message packet (i.e., a variable timing pattern bundled request message) based on dqProlog value. If more packets are expected IOM waits until last packet is received.

Then IOM firmware:
1. Scans thru the packet to find what DQVTDTA entries belong to its MAC
2. When firmware finds entry with valid destination address it calculates reply delay and program timer to fire interrupt when timer reaches terminal value. IOM executes command specified in dqCommand field according with DqData.
3. Firmware fills reply packet of requested size with data
4. Writes dest address into src field in Eth header
5. Fills type field in Eth packet with requested size
6. Writes dqCommand field as (dqCommand | 0x1000)
7. Writes value into dqCounter field and set dqCommand bits if any special (error) conditions exists
8. Adds prepared packet into output queue
9. Scans received packet for more entries, then goes to step 2
10. When interrupt from Timer 2 fires it sends the packet back.

dqCounter field is used to count packets. See DqTS description.

DqTS frame is divided into operation period and error correction/PnP period. If at the end of the operation period CC encounters broken or missing packet it tries to resend request to the associated IOM. Only one request can be done in error correction period.

Each second CC sends DQCMD_ECHOPNP in error correction/PnP period. See DqTS description.

3. DaqBIOS commands description

Command: DQCMD_ECHB, Broadcast Echo

Value: 0x100
Input data: None
Output data: None
Effect: Each device on replies back to the central controller. Collisions are detected and IOM resend packet until success.
Note: Do not use this command in <operation> mode.

Command: DQCMD_ECHO, Echo

Value: 0x1F0
Input data: None
Output data: None
Effect: Specified device replies back to the central controller.
Note: This command is safe in <operation> mode.

Command: DQCMD_ECHOPNP, Broadcast Echo for PnP

Value: 0x1F2
Input data: None
Output data: None
Effect: Only non-initialized devices replies back to the central controller. Device considers itself non-initialized upon receiving DQCMD_RST command.
Note: This command is safe in <operation> mode. CC sends this command each second to scan network for newly attached devices.

Command: DQCMD_RST, Reset Device

Value: 0x101
Input data: None
Output data: None
Effect: Resets device specified. After this command device considers itself "initialized" and switch to <init> mode.

Command: DQCMD_RSTALL, Broadcast Reset

Value: 0x1F2
Input data: None
Output data: None
Effect: Resets firmware for all devices on the network

Command: DQCMD_RDCFG, Retrieve Configuration Data

Value: 0x102
Input data: None
Output data: 32-bytes of configuration data
```
typedef struct {
        u32     model;          // device model
        u32     ipaddr;         // ip address
        u32     sernum;         // serial number
        int     caldate;        // calibration date/out-of-cal error
        u16     slice[8];       // device (slice) model information
} DQRDCFG, * pDQRDCFG;
```
Effect: Returns configuration data.

Command: DQCMD_WRVAL, Write Value to the Device

Value: 0x103
Input data:
```
        u32 address;            // address to write value
```

```
        u32 data;         // data to write
```
Output data: Returns error bit ERREXEC set in dqCounter if write caused an exception
Effect: Write data to the physical <address>

Command: DQCMD_RDVAL, Read Value from the Device
Value: 0x104
Input data:
```
        u32 address;      // address to write value
```
Output data:
```
        u32 data;         // data read
```
Returns error bit ERREXEC set in dqCounter if read caused an exception
Effect: Write data to the physical <address>

Command: DQCMD_WRVALM, Write Multiple Values to the Device
Value: 0x105
Input data:
```
        u32 address;      // address to write value
        s16 increment;    // address increment/decrement after each write
        u8  size;         // size of operand and four lower bits of
increment
        u8  count;        // number of values to write
        u32 data;         // data to write
```

Output data: Returns error bit ERREXEC set in dqCounter if write caused an exception
Effect: Write data to the physical <address>
Note: Maximum count is limited by the packet size.

Command: DQCMD_RDVALM, Read Multiple Values from the Device
Value: 0x106
Input data:
```
        u32 address;      // address to write value
        s16 increment;    // address increment/decrement after each read
        u8  size;         // size of operand and four lower bits of
increment
        u8  count;        // number of values to read
```
Output data:
```
        u32 data;         // data read
```

Returns error bit ERREXEC set in dqCounter if write caused an exception
Effect: Reads data from the physical <address>
Note: Maximum count is limited by the packet size.

Command: DQCMD_SETCFG, Set Configuration for the Device
Value: 0x110
Input data:
```
DQSETCFG SetCfg[6];
```

```
typedef struct {
      u16 device;  // device number
      u32 config;  // configuration
} DQSETCFG;
```
Output data:
```
      u32 Status[6];  // device status
```
Note:
1. Use device |= 0x8000 to tell that this the last device in the list
2. IOM reads status register of the specified devices only
3. DqVT packet can contain more entries

Command: DQCMD_RDSTS, Read Device Status
Value: 0x111
Input data:
```
      u16 device;  // device number
```
Output data:
```
      u32 Status[8];  // device status
```
Note:
1. Use device |= 0x8000 to tell that this the last device in the list
2. IOM reads status register of the specified devices only
3. DqVT packet can contain more entries, however number of devices per IOM is limited to 8

Command: DQCMD_WRCHNL, Write Channel
Value: 0x112
Input data:
```
DQWRCHNL Chnl[9];
typedef struct {
      u8 device;   // device number
      u8 channel;  // channel to write to
      u16 data;    // configuration
} DQWRCHNL;
```
Output data:
```
      None
```
Note:
1. Use device |= 0x80 to tell that this the last device in the list
2. DqTS can write 9 channels. DqVT packet can contain more entries

Command: DQCMD_RDCHNL, Read Channel
Value: 0x113
Input data:
```
DQRDCHNL Chnl[18];
typedef struct {
      u8 device;   // device number
      u8 channel;  // channel to read from
} DQRDCHNL;
```

Output data:
```
u16 chdata[18];
```
Note:
1. Use device |= 0x80 to tell that this the last device in the list
2. DqTS can read 18 channels. DqVT packet can contain more entries

Command: DQCMD_SETCLK, Set Clock Rate
Value: 0x114
Input data:
```
DQWRCHNL ClkRate[8];
typedef struct {
        u16 device;       // device number
        u32 clockrate;    // 66MHz divisor
} DQSETCLK;
```
Output data:
   None
Note:
1. Use device |= 0x80 to tell that this the last device in the list

Command: DQCMD_START, Start/Stop Devices by Mask
Value: 0x115
Input data:
```
u8 Mode[36];
```
Output data:
   None
Note:
   Starts device by the mask. Mode[0] is the first device, etc. Bits defines device subsystems if any. For examples, to start device 1 write Mode[1] = 0x1. To stop it Mode[1] = 0;

Command: DQCMD_SETCL, Set Channel List
Value: 0x121
Input data:
```
DQSETCL chlist[12];
typedef struct {
        u8 device;    // device number
        u8 channel;   // 66MHz divisor
        u8 dircfg;    // direction and configuration bits
} DQSETCL;
```

Output data:
   None
Note:
1. SETCL creates sequence of channels to read or write from/to device. After channel list is set one can issue DQCMD_RDALL to read all data specified by the channel list or DQCMD_WRALL to write all data. Some devices (with streaming function) require use of DQCMD_RDFIFO and DQCMD_WRFIFO to access data.
2. SETCL is additive function. Each time you write it adds channel to the existing channel list. Please reset device to clear channel list.
3. Use device |= 0x80 to tell that this the last device in the list

Command: DQCMD_RDALL, Read All Data
Value: 0x117
Input data:
```
u16 size;        // Amount of data to read
```
Output data:
```
u16 Data[18];    // data from the device
```
Note:
1. Size of the actual data in the packet is returned in dqCounter field
2. DqTS can read 18 channels. DqVT packet can contain more entries
3. If there is more data to read (channel list has more entries then packet of data can accommodate) dqCounter contains bit MOREDATA. Sequential reads will retrieve all data until ERRNOMORE bit is set
4. Amount of transferred data is min(packet_size, channel_list_size);
5. Bit 15 in input data <size> (dqCounter field) resets write sequence

Command: DQCMD_WRALL, Write All Data
Value: 0x118
Input data:
```
u16 Data[18];    // data to the device
```
Output data:
None
Note:
1. Size of the actual data in the packet is transmitted in dqCounter field
2. DqTS can write to 18 channels. DqVT packet can contain more entries
3. If device needed more data to write (channel list has more entries then packet of data can accommodate) dqCounter contains bit MOREDATA. Sequential writes will write all data until ERRNOMORE bit is set.
4. Bit 15 in <size> (dqCounter field) resets write sequence

Command: DQCMD_WRRD, Write All Data and Read Data Back
Value: 0x133
Input data:
```
u16 sizew;       // amount of data to write
u16 sizer;       // amount of data to read
u16 Data[16];    // data to the device
```
Output data:
```
u16 sizer;       // amount of data read
u16 sizew;       // amount of data written
u16 Data[16];    // data from the device
```

Note:
1. This request combines DQCMD_WRALL and DQCMD_RDALL. It allows to write all data according to output channel list and read all data according to input channel list. For example it's useful for DIO device with bi-directional lines.
2. Bit 15 in <size> resets sequence
3. If device needed more data to read dqCounter contains bit MOREDATA. When all data is written and device cannot accept more data ERRNOMORE bit is set.
4. This is, probably, the main request to issue in operation mode. It sends all data for outputs to the device and retrieve all inputs. Sequence is controlled by the channel list.
5. DqTS can write to 16 entries. DqVT packet can contain more entries

Command: DQCMD_WRFIFO, Write Data to the Device FIFO
Value: 0x121
Input data:
```
u8 device;         // device
u8 channel;        // channel (optional)
u16 size;          // amount of data to write
u16 Data[16];      // data to the device
```
Output data:
None Note:
1. DqTS can write to 16 entries. DqVT packet can contain more entries
2. If device needed more data to write (channel list has more entries then packet of data can accommodate) dqCounter contains bit MOREDATA. Sequential writes will write all data until ERRNOMORE bit is set.
3. Bit 15 in <size> resets FIFO

Command: DQCMD_RDFIFO, Read Device Data from the FIFO
Value: 0x117
Input data:
```
u8 device;         // device
u8 channel;        // channel (optional)
u16 size;          // amount of data to read
```
Output data:
```
u16 size;          // amount of data read
u16 Data[16];      // data from the device
```
Note:
1. DqTS can read 16 entries. DqVT packet can contain more entries
2. If there is more data to read (channel list has more entries then packet of data can accommodate) dqCounter contains bit MOREDATA. Sequential reads will retrieve all data until ERRNOMORE bit is set
3. Bit 15 in <size> resets FIFO

Command: DQCMD_WRFLASH, Write Data to the Flash Update Buffer
Value: 0x107
Inputs data:
```
    u8 Data[36];      // data from the device
```
Output data:
```
    u32 CRC;          // CRC-code
```
Note:
1. Size of data is stored in `dqCounter` field

Command: DQCMD_UPDFLASH, Update Flash Data from the Flash Update Buffer
Value: 0x135
Inputs data:
```
    u16 sector;       // Flash sector {SA1 - SA11 for 2MB}
    u32 size;         // amount of data to write
```
Output data:
```
    u32 CRC;          // CRC-code
```
Note:
1. This operation takes tens of seconds to complete. At the time of Flash update device might be unreachable via DaqBIOS. However it might be possible to reply DQCMD_ECHO with DEVBUSY bit set in `dqCounter`

Command: DQCMD_SETCOMM, Set Communication Parameters
Value: 0x136
Inputs data:
```
    u8 MAC[6];        // MAC address
    u32 netip;        // ip address
    u32 gateway;      // gateway
    u32 netmask;      // network mask
    u32 startup;      // startup parameters
    u32 baudrate;     // baud rate for UART
```
Output data:
```
    u32 CRC;          // CRC-code
```
Note: < startup > has four bytes:
```
    u8 autorun;  /* 0 - wait for command, 1 - autorun */
    u8 runtype;  /* 0 - wait for init, 1 - run with stored parameters */
    u8 portnum;  /* current port to serve - main DqBIOS interface:
Eth,U0,IrDA,USB*/
    u8 protocol;/* select protocol: DqTS, DqTS+DqVT, Dq over TCP/IP */
```

Command: DQCMD_SETNAME, Set Device Name
Value: 0x137
Inputs data:
```
    u8 name[33];      // device name (asciiz)
```
Output data:
```
    u32 CRC;          // CRC-code
```
Note:

Command: DQCMD_SETPWRUP, Set Power-Up Values

Value: 0x138
Inputs data:
```
u8 device;        // device name (asciiz)
u8 channel;       // channel
u32 direction;    // I/O direction
u32 value;        // channel value
```
Output data:
```
u32 CRC;          // CRC-code
```
Note:
1. For DIO devices direction and value are masks. <direction> = 0 for input and 1 for output

Command: DQCMD_SAVEPRM, Set Device Name

Value: 0x139
Inputs data:
   None
Output data:
   None
Note:
1. Function saves current device parameters: network parameters, name, channel list, clocks, I/O direction, etc.
2. If <startup> is set to use saved parameters device starts operations immediately after reset. CC doesn't need to configure device.

Command: DQCMD_SETMD, Set Mode of Operation

Value: 0x125
Inputs data:
```
u32 mode;         // {operation = 0, init = 1, test = 2, shutdown = 3}
```
Output data:
Note:

When IOM is in <init> mode it can be configured. In <operation> mode it can read/write values, but in this example implementation cannot change settings like channel list, configuration, direction, etc. In <test> mode device performs self-test. Read status to find out whether bit DEVICEOK is set. In <shutdown> mode device sets all input/outputs to the safe values (the power-up values).

What is claimed is:

1. A method comprising:
generating a set of commands, each of which is configured to elicit a response from a different one of multiple data acquisition modules;
providing timing information associated with the set of commands to coordinate responses from the multiple data acquisition modules over a shared communication link; and
transmitting the set of commands to the multiple data acquisition modules; and
receiving the responses from the multiple data acquisition modules over the shared communication link in accordance with the timing information.

2. A method as in claim 1, wherein receiving the responses from the multiple data acquisition modules includes receiving feedback from a given data acquisition module of the multiple data acquisition modules indicating that the given data acquisition module requires more time to transmit data over the shared communication link.

3. A method as in claim 2 further comprising:
in response to receiving the feedback, modifying the timing information associated with the set of commands transmitted on a subsequent query/response data acquisition cycle to allocate more time for the given data acquisition module to transmit data over the shared communication link relative to a previous query/response data acquisition cycle.

4. A method as in claim 1, wherein providing the timing information associated with the commands includes specifying a relative ordering of the multiple data acquisition modules to respond over the shared communication link with respect to each other.

5. A method as in claim 1 further comprising:
for a first query/response data acquisition cycle, specifying a first relative ordering for the multiple data acquisition modules to respond to the commands over the shared communication link; and
on a subsequent query/response data acquisition cycle, modifying the first relative ordering by specifying a second relative ordering for the multiple data acquisition modules to respond to the commands over the shared communication link.

6. A method as in claim 1, wherein providing the timing information includes specifying respective delay times for each of the multiple data acquisition modules to respond to the set of commands.

7. A method as in claim 1, wherein providing the timing information includes specifying respective window times for each of the multiple data acquisition modules to respond to the set of commands.

8. A method as in claim 1, wherein providing the timing information includes:
specifying respective delay times for each of the multiple data acquisition modules to respond to the set of commands;
specifying respective window times for each of the multiple data acquisition modules to respond to the set of commands; and
transmitting the respective delay times and the respective window times over the shared communication link to the multiple data acquisition modules to coordinate the responses from the data acquisition modules over the shared communication link.

9. A method as in claim 1, wherein transmitting the set of commands to the multiple data acquisition modules includes multicasting a bundled message including the set of commands to each of the data acquisition modules.

10. A method as in claim 1, wherein providing the timing information associated with the set of commands to coordinate responses from the multiple data acquisition modules includes selecting a timing pattern in which each of at least two of the multiple data acquisition modules is allocated different amounts of time to respond over the shared communication link.

11. A method as in claim 1, wherein generating the respective commands includes generating a bundled message including the respective commands for each of the multiple data acquisition modules;
wherein providing the timing information associated with the commands includes providing the timing information in the bundled message to coordinate responses from the multiple data acquisition modules over the shared communication link; and
wherein transmitting the respective commands to the multiple data acquisition modules includes transmitting the bundled message including the respective commands and the timing information to each of the data acquisition modules.

12. A method as in claim 11 further comprising:
receiving responses from the multiple data acquisition modules in accordance with the timing information in the bundled message.

13. A method as in claim 12, wherein providing the timing information includes:
specifying response timing associated with a first data acquisition module and a second data acquisition module such that, during respective responses from the first data acquisition module and the second data acquisition module, the respective responses do not interfere with each other when transmitted over the shared communication link.

14. A method as in claim 1 further comprising:
allocating a portion of a future query/response data acquisition cycle for re-transmitting failed communications from one of the data acquisition modules during a previous query/response data acquisition cycle.

15. A central controller comprising:
a communications interface;
a memory;
a processor; and
an interconnection mechanism coupling the communications interface, the memory and the processor;
wherein the memory is encoded with a data acquisition basic input output system application that when performed on the processor, produces a data acquisition basic input output system process that enables the central controller to perform operations of:
generating a set of commands, each of which is configured to elicit a response from a different one of multiple data acquisition modules;
providing timing information associated with the set of commands to coordinate responses from the multiple data acquisition modules over a shared communication link; and
transmitting the set of commands to the multiple data acquisition modules; and
receiving the responses from the multiple data acquisition modules over the shared communication link in accordance with the timing information.

16. A central controller as in claim 15, wherein receiving the responses from the multiple data acquisition modules includes receiving feedback from a given data acquisition module of the multiple data acquisition modules indicating that the given data acquisition module requires more time to transmit data over the shared communication link.

17. A central controller as in claim 16 further supporting operations of:
in response to receiving the feedback, modifying the timing information associated with the set of commands transmitted on a subsequent query/response data acquisition cycle to allocate more time for the given data acquisition module to transmit data over the shared communication link relative to a previous query/response data acquisition cycle.

18. A central controller as in claim 15, wherein providing the timing information associated with the commands includes specifying a relative ordering of the multiple data acquisition modules to respond over the shared communication link with respect to each other.

19. A central controller as in claim 15 further supporting operations of:
for a first query/response data acquisition cycle, specifying a first relative ordering for the multiple data acquisition modules to respond to the commands over the shared communication link; and
on a subsequent query/response data acquisition cycle, modifying the first relative ordering by specifying a second relative ordering for the multiple data acquisition modules to respond to the commands over the shared communication link.

20. A central controller as in claim 15, wherein providing the timing information includes specifying respective delay times for each of the multiple data acquisition modules to respond to the set of commands.

21. A central controller as in claim 15, wherein providing the timing information includes specifying respective window times for each of the multiple data acquisition modules to respond to the set of commands.

22. A central controller as in claim 15, wherein providing the timing information includes:
specifying respective delay times for each of the multiple data acquisition modules to respond to the set of commands;
specifying respective window times for each of the multiple data acquisition modules to respond to the set of commands; and
transmitting the respective delay times and the respective window times over the shared communication link to the multiple data acquisition modules to coordinate the responses from the data acquisition modules over the shared communication link.

23. A central controller as in claim 15, wherein transmitting the set of commands to the multiple data acquisition modules includes multicasting a bundled message including the set of commands to each of the data acquisition modules.

24. A central controller as in claim 15, wherein providing the timing information associated with the set of commands to coordinate responses from the multiple data acquisition modules includes selecting a timing pattern in which each of at least two of the multiple data acquisition modules is allocated different amounts of time to respond over the shared communication link.

25. A central controller as in claim 15, wherein generating the respective commands includes generating a bundled message including the respective commands for each of the multiple data acquisition modules;
wherein providing the timing information associated with the commands includes providing the timing information in the bundled message to coordinate responses from the multiple data acquisition modules over the shared communication link; and
wherein transmitting the respective commands to the multiple data acquisition modules includes transmitting the bundled message including the respective commands and the timing information to each of the data acquisition modules.

26. A central controller as in claim 25 further supporting operations of:
receiving responses from the multiple data acquisition modules in accordance with the timing information in the bundled message.

27. A central controller method as in claim 26, wherein providing the timing information includes:
specifying response timing associated with a first data acquisition module and a second data acquisition module such that, during respective responses from the first data acquisition module and the second data acquisition module, the respective responses do not interfere with each other when transmitted over the shared communication link.

28. A central controller as in claim 15 further supporting operations of:
allocating a portion of a future query/response data acquisition cycle for re-transmitting failed communications from one of the data acquisition modules during a previous query/response data acquisition cycle.

29. A controller comprising:
means for generating a set of commands, each of which is configured to elicit a response from a different one of multiple data acquisition modules;
means for providing timing information associated with the set of commands to coordinate responses from the multiple data acquisition modules over a shared communication link;
means for transmitting the set of commands to the multiple data acquisition modules; and
means for receiving the responses from the multiple data acquisition modules over the shared communication link in accordance with the timing information.

* * * * *